US012812371B2

(12) United States Patent
Lee et al.

(10) Patent No.: US 12,812,371 B2
(45) Date of Patent: Nov. 24, 2026

(54) USER PLANE SECURITY ANCHOR FOR A WIRELESS NETWORK SERVICE SECURITY ARCHITECTURE

(71) Applicant: QUALCOMM Incorporated, San Diego, CA (US)

(72) Inventors: Soo Bum Lee, San Diego, CA (US); Miguel Griot, La Jolla, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 18/447,069

(22) Filed: Aug. 9, 2023

(65) Prior Publication Data

US 2025/0056216 A1 Feb. 13, 2025

(51) Int. Cl.
*H04W 12/041* (2021.01)
*H04W 12/0431* (2021.01)

(52) U.S. Cl.
CPC ..... *H04W 12/041* (2021.01); *H04W 12/0431* (2021.01)

(58) Field of Classification Search
CPC ........... H04W 12/041; H04W 12/0431; H04W 12/033; H04W 12/043; H04W 12/106
See application file for complete search history.

(56) References Cited

U.S. PATENT DOCUMENTS

| | | | | |
|---|---|---|---|---|
| 10,863,351 | B2 * | 12/2020 | Trainin | H04W 12/06 |
| 12,096,391 | B2 * | 9/2024 | Kolanowski | H04W 4/20 |
| 2022/0086742 | A1 * | 3/2022 | Arrobo Vidal | H04W 48/16 |
| 2022/0150696 | A1 * | 5/2022 | Rajadurai | H04W 12/041 |

FOREIGN PATENT DOCUMENTS

EP 4135256 A1 2/2023

OTHER PUBLICATIONS

International Search Report and Written Opinion—PCT/US2024/040636—ISA/EPO—Jan. 8, 2025.

Partial International Search Report—PCT/US2024/040636—ISA/EPO—Nov. 4, 2024.

Qualcomm Incorporated: "pCR: Solution for UE-UPF Security Setup", 3GPP TSG SA WG3 (Security) Meeting #86Bis, S3-170834, 3rd Generation Partnership Project (3GPP), Mobile Competence Centre, 650, Route Des Lucioles, F-06921 Sophia-Antipolis Cedex, France, Mar. 27, 2017, XP051248585, 6 pages, p. 1-p. 3, figures 5.1.4. x.2.1.3-1.

* cited by examiner

*Primary Examiner* — Dhaval V Patel
(74) *Attorney, Agent, or Firm* — Polsinelli LLP

(57) ABSTRACT

An apparatus, method and computer-readable media are disclosed for performing wireless communications. For example, a process for securely accessing a service, can include: receiving, by a security service from a service, a request for a service key for accessing the service, the request for the service key including an indication to use a user plane security anchor (UPSA); transmitting, from the security service in response to the request for the service key, a service key response including the service key; receiving an indication for a UPSA key, the indication including an identifier for a UPSA for the service; generating the UPSA key based on the identifier for the UPSA; and transmitting the generated UPSA key to the UPSA for establishing a user plane security context between the UPSA and a wireless device.

20 Claims, 14 Drawing Sheets

USER PLANE SECURITY ANCHOR FOR A WIRELESS NETWORK SERVICE SECURITY ARCHITECTURE

FIELD

The present disclosure generally relates to wireless communications. For example, aspects of the present disclosure relate to a user plane security anchor for a wireless network service security architecture.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. A sixth-generation (6G) mobile standard may build on 5G to offer further increased data transfer speeds, better coverage, and improved security, among other improvements.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method for securely accessing a service is provided. The method includes: receiving, by a security service from a service, a request for a service key for accessing the service, the request for the service key including an indication to use a user plane security anchor (UPSA); transmitting, from the security service in response to the request for the service key, a service key response including the service key; receiving an indication for a UPSA key, the indication including an identifier for a UPSA for the service; generating the UPSA key based on the identifier for the UPSA; and transmitting the generated UPSA key to the UPSA for establishing a user plane security context between the UPSA and a wireless device.

As another example, an apparatus for securely accessing a service is provided. The apparatus includes: a memory system comprising instructions; and a processor system coupled to the memory system. The processor system is configured to: receive, by a security service from a service, a request for a service key for accessing the service, the request for the service key including an indication to use a user plane security anchor (UPSA); transmit, from the security service in response to the request for the service key, a service key response including the service key; receive an indication for a UPSA key, the indication including an identifier for a UPSA for the service; generate the UPSA key based on the identifier for the UPSA; and transmit the generated UPSA key to the UPSA for establishing a user plane security context between the UPSA and a wireless device.

In another example, a non-transitory computer-readable medium is provided. The non-transitory medium has stored thereon instructions that, when executed by a processor system, cause the processor system to: receive, by a security service from a service, a request for a service key for accessing the service, the request for the service key including an indication to use a user plane security anchor (UPSA); transmit, from the security service in response to the request for the service key, a service key response including the service key; receive an indication for a UPSA key, the indication including an identifier for a UPSA for the service; generate the UPSA key based on the identifier for the UPSA; and transmit the generated UPSA key to the UPSA for establishing a user plane security context between the UPSA and a wireless device.

As another example, an apparatus for securely accessing a service is provided. The apparatus includes: means for receiving, by a security service from a service, a request for a service key for accessing the service, the request for the service key including an indication to use a user plane security anchor (UPSA); means for transmitting, from the security service in response to the request for the service key, a service key response including the service key; means for receiving an indication for a UPSA key, the indication including an identifier for a UPSA for the service; means for generating the UPSA key based on the identifier for the UPSA; and means for transmitting the generated UPSA key to the UPSA for establishing a user plane security context between the UPSA and a wireless device.

In another example, a method for securely accessing a service is provided. The method includes: receiving, by the service of a wireless network from a wireless device, a service access request, the service access request requesting access to the service, and the service access request including a temporary identifier for the wireless device; transmitting a service key request from the service to a security service, the service key request including an indication to use a user plane security anchor (UPSA); receiving, in response to the service key request, service key information for accessing the service; establishing a security context with the wireless device based on the service key information; transmitting a configuration request to a transport service to select a UPSA for the service; receiving, in response to the configuration request, an identifier for the UPSA; and transmitting, to a security service of the wireless network, an indication for a UPSA key, the indication for the UPSA key including the identifier for the UPSA for establishing user plane security context.

As another example, an apparatus for securely accessing a service is provided. The apparatus includes: a memory system comprising instructions; and a processor system coupled to the memory system. The processor system is configured to: receive, by the service of a wireless network from a wireless device, a service access request, the service access request requesting access to the service, and the service access request including a temporary identifier for the wireless device; transmit a service key request from the service to a security service, the service key request including an indication to use a user plane security anchor (UPSA); receive, in response to the service key request, service key information for accessing the service; establish a security context with the wireless device based on the service key information; transmit a configuration request to a transport service to select a UPSA for the service; receive, in response to the configuration request, an identifier for the UPSA; and transmit, to a security service of the wireless network, an indication for a UPSA key, the indication for the UPSA key including the identifier for the UPSA for establishing user plane security context.

In another example, a non-transitory computer-readable medium is provided. The non-transitory computer-readable medium has stored thereon instructions that, when executed by a processor system, cause the processor system to: receive, by a service of a wireless network from a wireless device, a service access request, the service access request requesting access to the service, and the service access request including a temporary identifier for the wireless device; transmit a service key request from the service to a security service, the service key request including an indication to use a user plane security anchor (UPSA); receive, in response to the service key request, service key information for accessing the service; establish a security context with the wireless device based on the service key information; transmit a configuration request to a transport service to select a UPSA for the service; receive, in response to the configuration request, an identifier for the UPSA; and transmit, to a security service of the wireless network, an indication for a UPSA key, the indication for the UPSA key including the identifier for the UPSA for establishing user plane security context.

As another example, an apparatus for securely accessing a service is provided. The apparatus includes: means for receiving, by the service of a wireless network from a wireless device, a service access request, the service access request requesting access to the service, and the service access request including a temporary identifier for the wireless device; means for transmitting a service key request from the service to a security service, the service key request including an indication to use a user plane security anchor (UPSA); means for receiving, in response to the service key request, service key information for accessing the service; means for establishing a security context with the wireless device based on the service key information; means for transmitting a configuration request to a transport service to select a UPSA for the service; means for receiving, in response to the configuration request, an identifier for the UPSA; and means for transmitting, to a security service of the wireless network, an indication for a UPSA key, the indication for the UPSA key including the identifier for the UPSA for establishing user plane security context.

In another example, a method for securely accessing a service of a wireless network is provided. The method includes: transmitting, to a security service of the wireless network, a first service access request for accessing a service of the wireless network, wherein the service is separate from the security service; receiving, from the security service in response to the first service access request, service security information for accessing the service; transmitting, to the service, a second service access request, the second service access request encoded based on the service security information; receiving, from the service, an indication to use a user plane security anchor (UPSA); and establishing a first security context with the UPSA based on the indication to use the UPSA.

As another example, an apparatus for securely accessing a service of a wireless network is provided. The apparatus includes: a memory system comprising instructions; and a processor system coupled to the memory system. The processor system is configured to: transmit, to a security service of the wireless network, a first service access request for accessing a service of the wireless network, wherein the service is separate from the security service; receive, from the security service in response to the first service access request, service security information for accessing the service; transmit, to the service, a second service access request, the second service access request encoded based on the service security information; receive, from the service, an indication to use a user plane security anchor (UPSA); and establish a first security context with the UPSA based on the indication to use the UPSA.

In another example, a non-transitory computer-readable medium is provided. The non-transitory computer-readable medium has stored thereon instructions that, when executed by a processor system, cause the processor system to: transmit, to a security service of a wireless network, a first service access request for accessing a service of the wireless network, wherein the service is separate from the security service; receive, from the security service in response to the first service access request, service security information for accessing the service; transmit, to the service, a second service access request, the second service access request encoded based on the service security information; receive, from the service, an indication to use a user plane security anchor (UPSA); and establish a first security context with the UPSA based on the indication to use the UPSA.

As another example, an apparatus for securely accessing a service of a wireless network is provided. The apparatus includes: means for transmitting, to a security service of the wireless network, a first service access request for accessing a service of the wireless network, wherein the service is separate from the security service; means for receiving, from the security service in response to the first service access request, service security information for accessing the service; means for transmitting, to the service, a second service access request, the second service access request encoded based on the service security information; means for receiving, from the service, an indication to use a user plane security anchor (UPSA); and means for establishing a first security context with the UPSA based on the indication to use the UPSA.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
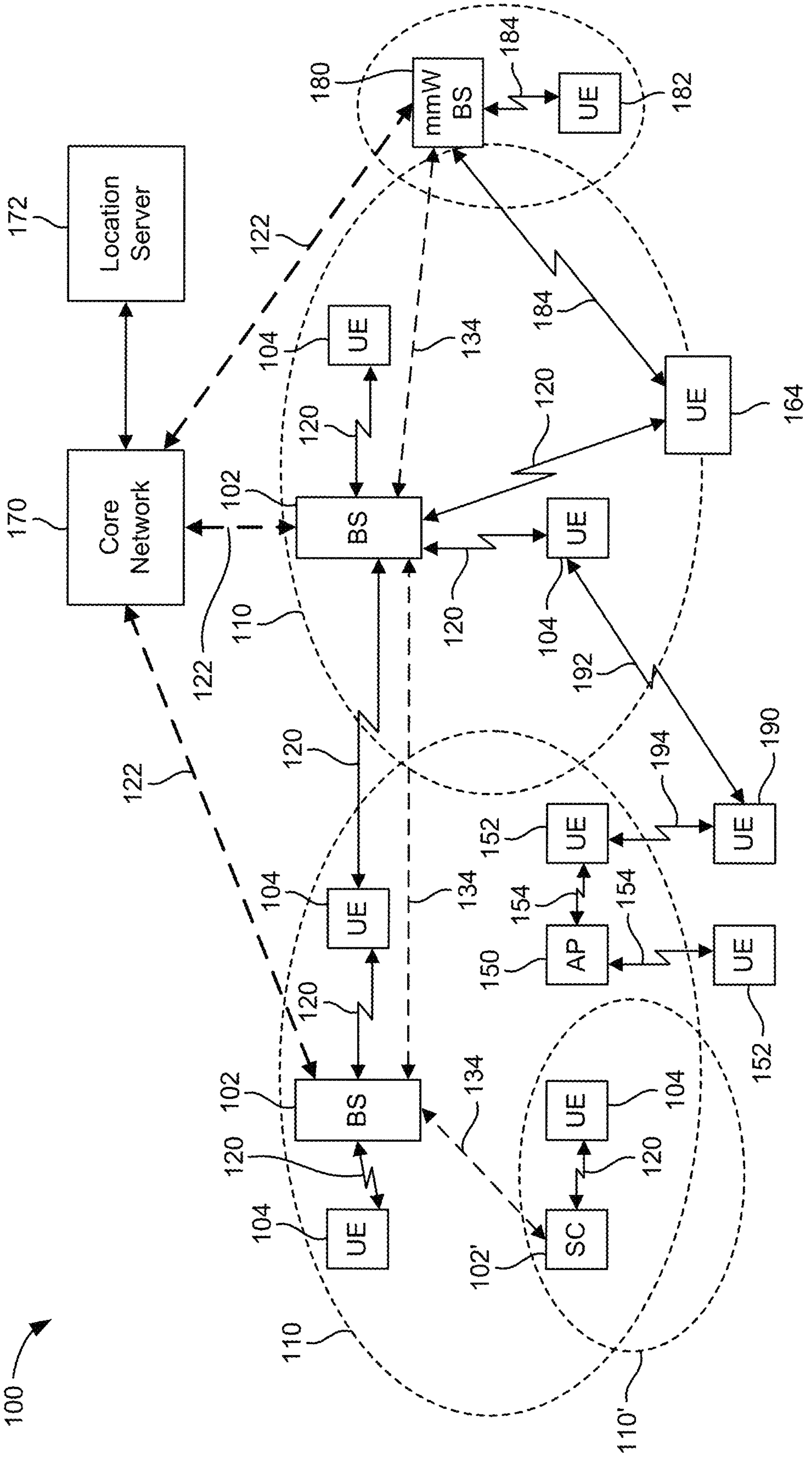
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3rd Generation Partnership Project (3GPP) gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

Various systems and techniques are provided with respect to wireless technologies (e.g., The 3GPP 5G/New Radio (NR) Standard, 6G, etc.) to provide improvements to wireless communications. A device (e.g., a UE, wireless device, mobile device, etc.) can be configured to access a wireless network (e.g., wireless system) to communicate with other devices. As a part of accessing the wireless network, the device may be configured to authenticate with the wireless network. Based on the authentication, the device may establish one or more security contexts to allow for private communications between the device and services of the wireless network. In some wireless networks, a device connecting to the wireless network would establish a security context with a security function of a core network (e.g., non-access stratum (NAS) security). Based on this security context, additional application layer security may be established on top of this security context. However, as additional security layers are built on the NAS security context of the security function, the security function may need to support the additional security layers, making it difficult to add services which may use security features that are not be supported by the security function.

Systems, apparatuses, processes (also referred to as methods), and computer-readable media (collectively referred to as "systems and techniques") are described herein for allowing different services to establish their own security. In some cases, a device may request access to a service by contacting a security service. The services may include services such as a mobility service, transport service, voice service, location service, internet service, and the like. The security service may provide services for authenticating and/or securely accessing other services such as by providing cryptographic keys that other services may use to secure communications with the device. Where the device is initially accessing the security service, the security service may perform an authentication and key agreement procedure with the device to generate a session root key and establish a security context with the security service based on the session root key. The session root key may be a cryptographic key from which other cryptographic keys, such as a service key, may be derived. The security service may then send the device service key information for the service the device is trying to access. In some cases, the service key information may include information for deriving the service key for the service. The device may use this service key information to derive a service key for accessing the service. The device may send a service request directly to the service encoded based on the service key. The service may then contact the security service to obtain the service key. Once the service obtains the service key from the security service, the service may decode the service access request from the device and establish a security context between the service and the device based on the service key. Any additional security layers may then be established on top of the security context between the service and device.

In some cases, certain services, such as more user facing services, may also use user plane security as between a point of connection from the device to the wireless network (e.g., a distributed unit, eNodeB, gNodeB, etc.) to a user plane security anchor (UPSA) function. In some cases, the UPSA may be implemented as a service and the wireless network may include multiple UPSAs at various locations of the wireless network. In some cases, a particular UPSA that a service may use can be determined based on characteristics of the service. For example, where the service is associated with relatively high mobility devices, the service may want to use a UPSA that May be located deeper inside the wireless system (e.g., near the core network/user plane services/etc.), rather than near edges of the wireless system (e.g., near the gNodeB/eNodeB/DU/CU/etc.) to help avoid frequent key changes due to mobility. Conversely, if the service is associated with relatively low mobility devices, or if latency is especially important for the service, the service may want to use a UPSA located closer to an edge of the wireless system. This UPSA preference, along with details of a type of user plane security used by the service, may be described in a service security policy. The service security policy may indicate which security features (e.g., DU security, user plane security, etc.) should be used with the service. In some cases, the service security policy may also indicate how a security feature may be configured (e.g., where a UPSA may be located in the wireless system for certain devices).

When a service receives a service access request, such as from a device, the service may request a service key from the security service. As a part of this service key request, the service may also send the service security policy to the security service. After (or concurrent with) establishment of the service security context between the service and the device, a configuration request to a transport service may be sent to set up a UPSA for the service. The configuration request may be transmitted by the service or the security service and the configuration request may include the service security policy. Based on the service, device, and service security policy, the transport service may determine a UPSA to use and may transmit a response to the configuration request including an indication of the UPSA to use (e.g., an identifier for the UPSA). The response to the configuration request may be sent to the service or the security service, based on which one sent the configuration request. Where the service sent the configuration request, the service may send, to the security service, a request a UPSA key be determined. Where the security service sent the configuration request, the security service may determine whether a UPSA key is needed. The security service may then determine a UPSA key. In some cases, the UPSA key may be determined based on an identifier for the service based on a session root key associated with the wireless device. The security service may transmit the UPSA key to the UPSA. The UPSA may then establish a user plane security context with the wireless device using the UPSA key.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHZ aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
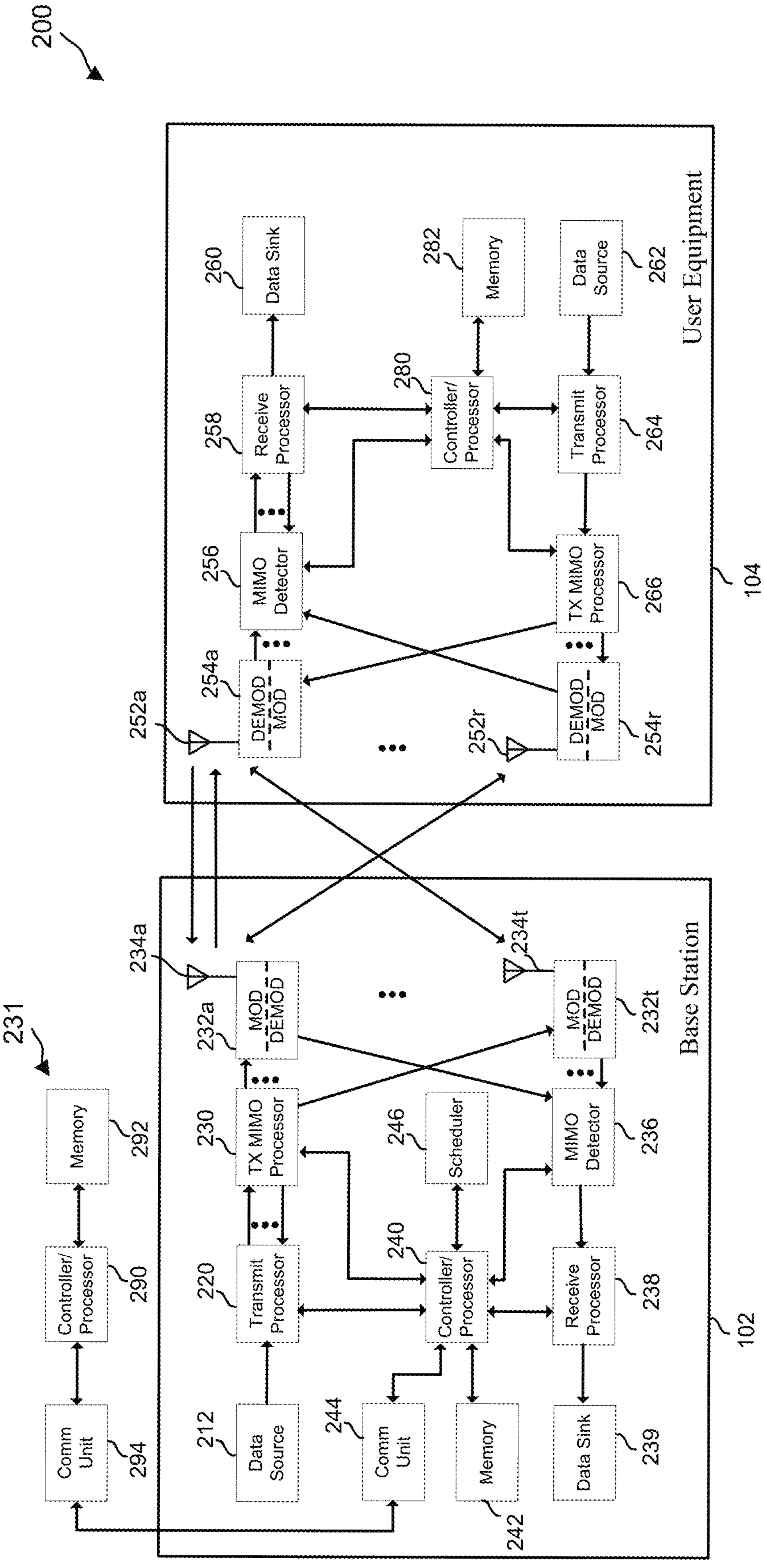
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, channel state information, channel state feedback, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators may be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals may be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators may be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ. CQI, channel state information, channel state feedback, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit uplink control information (UCI) beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
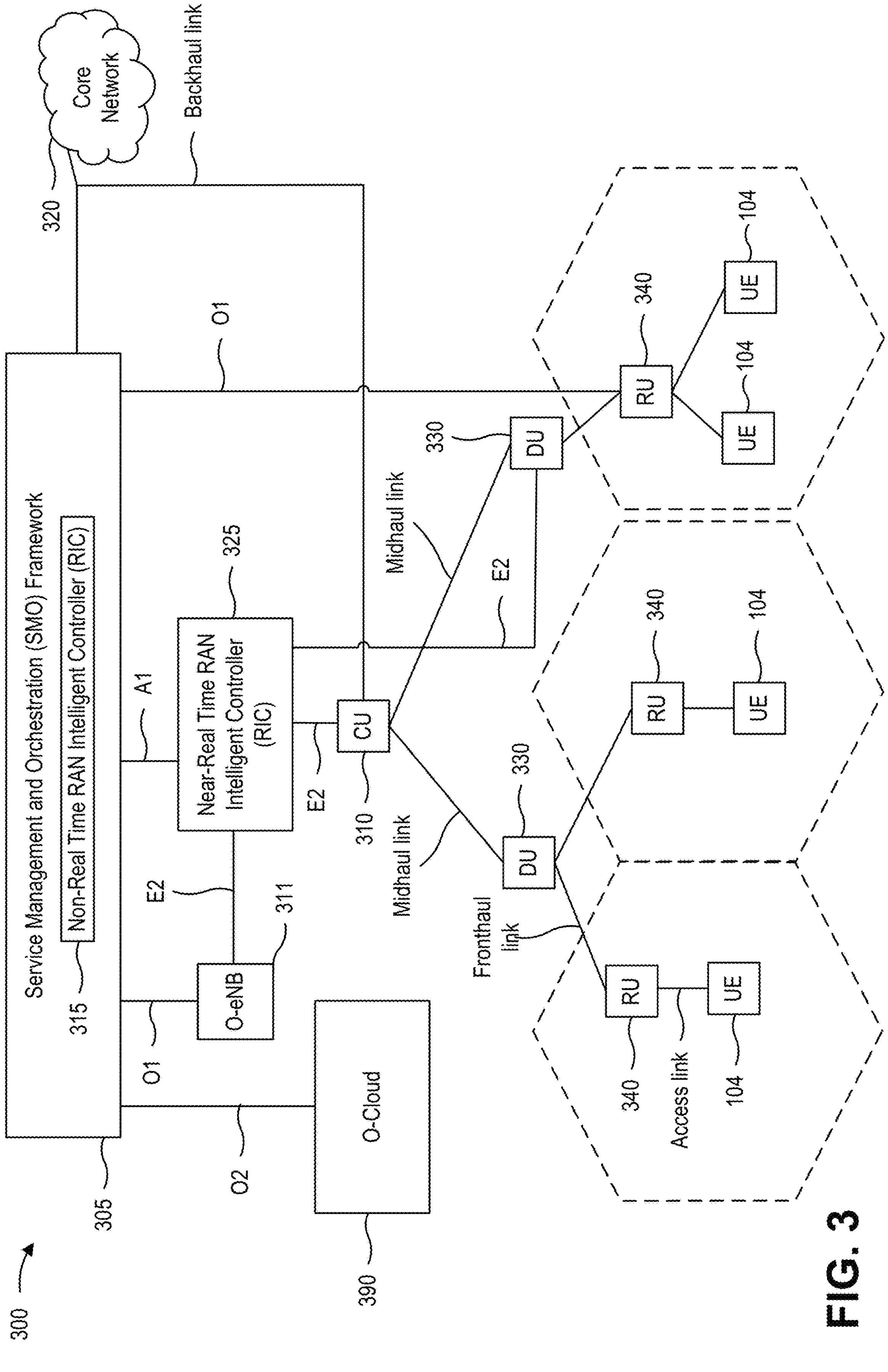
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUS 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
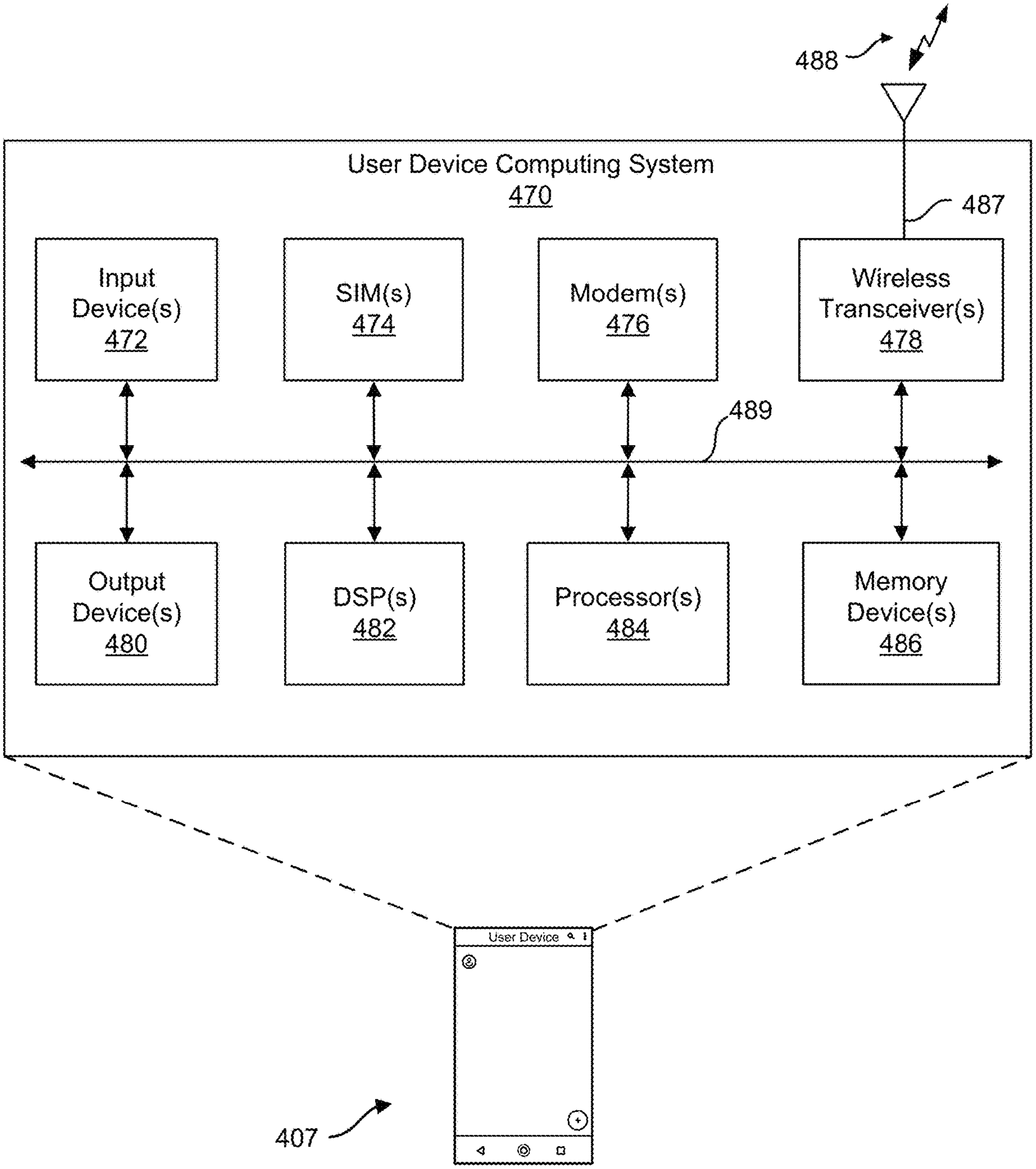
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

In some previous wireless systems, multiple security contexts exist on layer basis and multiple services may exist with a single security context. For example, a security context, that is a result of an authentication procedure to establish cryptographically secured communication between two elements, may be established between a mobile device, such as a UE, and a core network (e.g., a non-access stratum (NAS) security context between a UE and an access and mobility management function (AMF)). This NAS security context may anchor other security contexts as other security contexts may build on the NAS security context. Another security context (e.g., access stratum (AS) security context) may also be established based on the NAS security context through the AMF. Additional application specific security context may then be established via the connection through the AS security context. In some cases, it may be useful to separate the security contexts from the NAS security context so that the additional security contexts above the NAS are not all dependent on the connection between the mobile device and the AMF. Additionally, having separate security contexts for services may streamline implementation of additional services without having to make sure the AMF supports any security features of the additional services.

Figure 5:
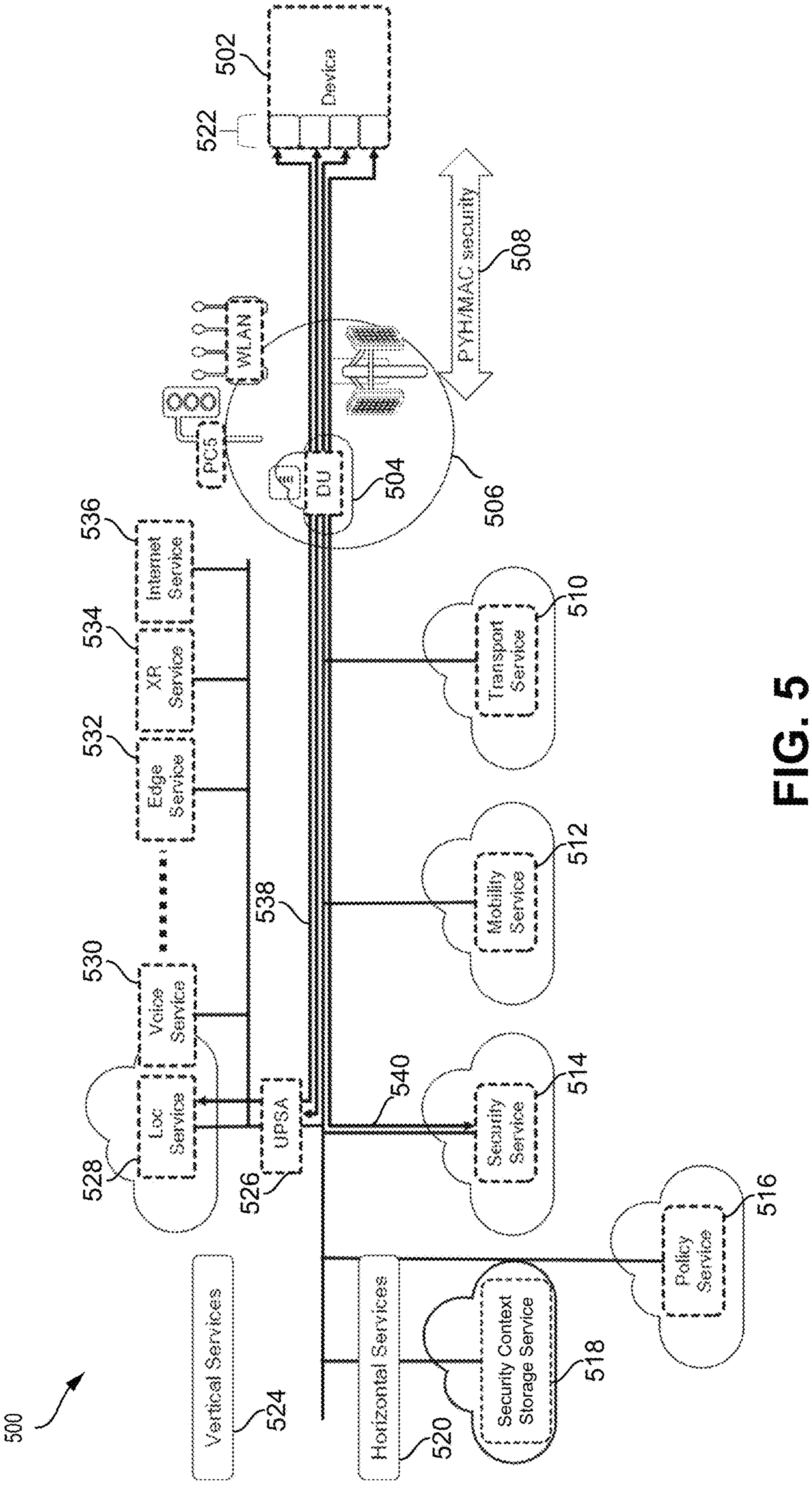
FIG. 5 is a diagram of a security architecture of a wireless system, according to aspects of the disclosure.

FIG. 5 is a diagram of a security architecture of a wireless system 500, according to aspects of the disclosure. In some cases, it may be useful to define a per service security context, for example, allow a service to tailor the security between the mobile device and the service without having explicit support from the wireless system 500. Wireless system 500 includes a device 502, which may be UE. The device 502 may be coupled to the wireless system 500 via a DU 504. In some cases, the connection between the device 502 and the DU 504 may be secured based on a physical layer and/or medium access control layer security 508. While a disaggregated base station 506 is shown in FIG. 5, it may be understood that any base station/access node design may be used, such as an eNodeB, gNodeB, aggregated/monolithic base station, Wi-Fi access point, and the like.

In some cases, allowing a per-service security context allows a device 502 to establish security context with specific services that are being used by the device 502, including for services that would previously fall under core network services, such as, for example, a mobility service 512, transport service 510, and the like. In some cases, services of a wireless system 500 may be divided into different types of services. For example, basic services and commonly used services of a wireless system 500 (e.g., similar to those services traditionally provided by a core network of a wireless system, such as routing and handing over the device 502 from base station to base station) may be referred to as horizontal services 520, shown here on a lower portion of FIG. 5. For example, the transport service 510, mobility service 512, security service 514, policy service 516, security context storage service 518, paging service (not shown) and the like may be considered horizontal services 520. Higher level services which more likely to be user facing (e.g., user plane applications) and more likely to be user specific may be referred to as vertical services 524. Examples of vertical services 524 include location services 528, voice services 530, edge services 532, XR services 534, internet services 536, and the like.

In some cases, a user plane security anchor (UPSA) 526 service may provide general transport security between the device 502 and vertical services 524. For example, the UPSA 526 may expand on functionality provided by a packet data convergence protocol layer (PDCP) of a 5G NR wireless system and may be used to anchor (e.g., terminate) the user plane security and/or access stratum security for vertical services 524 of the wireless system 500. In some cases, the UPSA 526 may support multiple services. In some cases, where the UPSA 526 is located in the network (e.g., near the edge of the network or closer to the core network) may be flexible and may vary based, for example, on what services may be supported or provided by the wireless system 500 and the device. For example, the UPSA 526 may be co-located at the DU 504, located within cloud services (e.g., user plane functions), located closer to the vertical services 524 being supported (e.g., co-located with the vertical services 524), and so forth. As an example, if the UPSA 526 is co-located at the DU 504 and terminates the user plane security at the DU 504, then the UPSA 526 may change (and associated service security keys may be changed) if the device 502 is mobile and moves to another DU/gNodeB/eNodeB. This may not be a concern for services for less mobile devices, such as IoT devices, but may be a concern for more mobile devices. In some cases, multiple UPSA 526 may be used, for example, depending on capabilities and/or requirements of the services supported, security requirements and/or policies of the network and/or location of the transport service 510 termination point. In some cases, the transport service 510 may control the UPSA 526 and the transport service 510 may be updated with the location(s) of the UPSA 526. The transport service 510 may then derive and/or provision certain service security keys to certain UPSAs 526 based on, for example, relative location of the UPSA 526 with respect to the service being accessed. In some cases, the UPSA 526 may be implemented as a service and a service security context between the device 502 and the UPSA 526 may be established for user plane service security.

In some cases, the device 502 may include multiple security contexts 522 where each security context is established with a specific service being used. For example, the device 502 may have a first security context 540 with the security service 514 and the device 502 may also have a second security context 538 with the location services 528. In some cases, the security service 514 may provide security services for the device 502 along with other network functions. For example, the security service 514 may help establish security contexts (e.g., establish authentication keys) as between other services and the device 502. In some cases, these security contexts may then be stored in the security context storage service 518. Other services may then access the security context storage service 518 to retrieve stored security contexts. Thus, the security service 514 may anchor security establishment between the device 502 and services of the wireless system 500. As an example, a service, such as the mobility service 512, may request a security context from the security service 514. The security service 514 may respond to the mobility service 512 a security key and this security key may be stored in the security context storage service 518 for later use by the mobility service 512 as needed.

In some cases, some services previously associated with a wireless node (e.g., gNodeB, DU, CU, etc.) may also be implemented as one or more horizontal services. For example, radio resource management, previously performed by a CU/gNodeB, may be implemented as a service (e.g., horizontal service 520) in a cloud.

Figure 6:
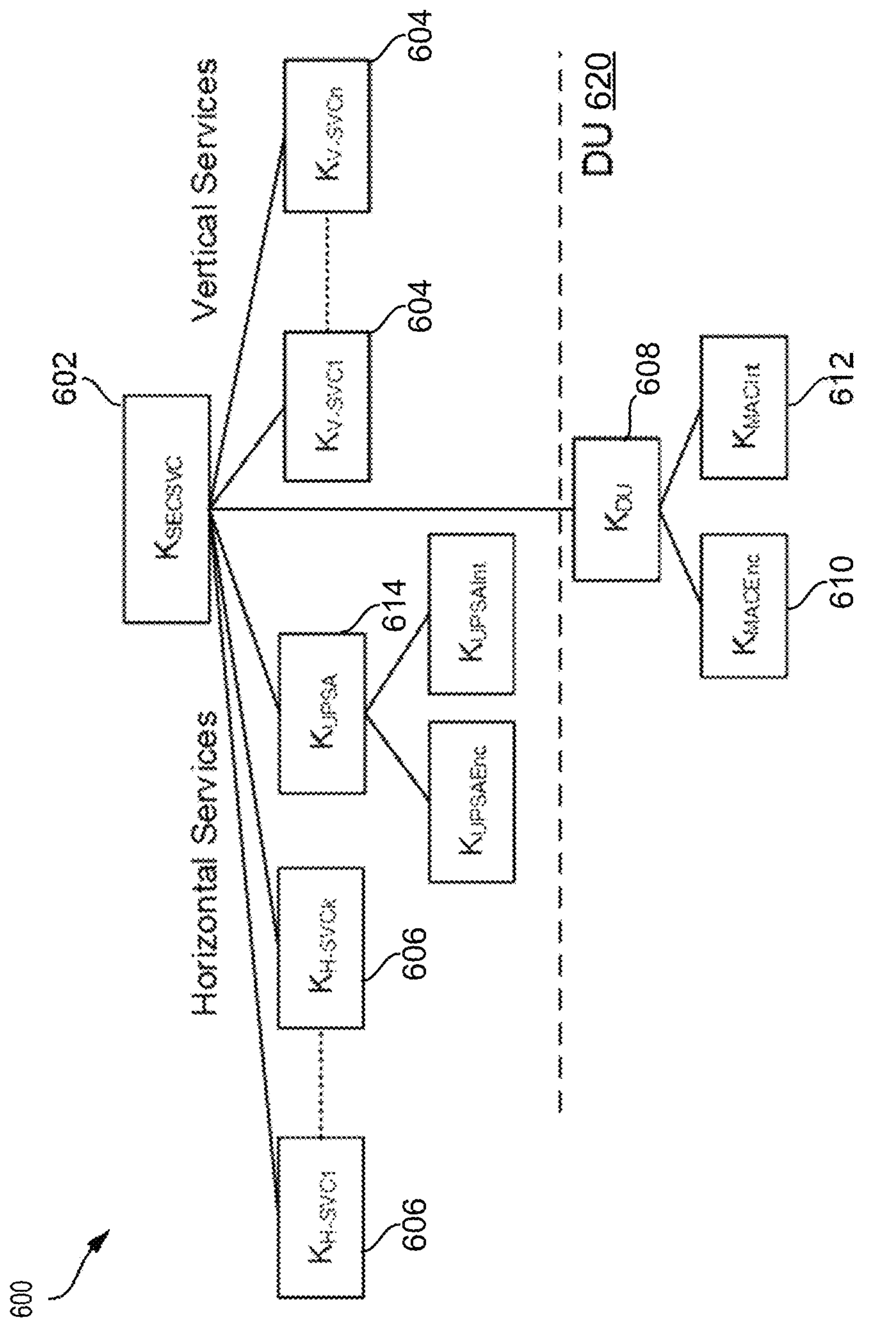
FIG. 6 is a tree diagram illustrating an encryption key hierarchy for services of a wireless system, such as the wireless system, in accordance with aspects of the present disclosure.

FIG. 6 is a tree diagram illustrating a key hierarchy 600 for services of a wireless system, such as the wireless system 500, in accordance with aspects of the present disclosure. In some cases, a device, such as device 502 of FIG. 5, may perform primary authentication and agree on a cryptographic key $K_{SECSVC}$ 602 (e.g., root key) with a security service, such as security service 514 of FIG. 5, as a part of establishing a connection with the wireless system. For example, the device may perform an authentication and key management (AKA) procedure with the security service and generate the root key. In some cases, additional cryptographic keys for other services provided by the wireless system may be derived based on the root key. For example, the security service may derive service keys for vertical services (e.g., $K_{V\text{-}SVC1}$-$K_{V\text{-}SVCn}$) 604 based on the root key $K_{SECSVC}$ 602. The security service may also derive service keys for some horizontal services (e.g., $K_{H\text{-}SVC1}$-$K_{H\text{-}SVCk}$) 604 based on the root key $K_{SECSVC}$ 602. Communications between the device and a vertical service and/or certain horizontal services may then be based on the service key (e.g., without having to go through the security service unless a new service key is needed) and security may be established directly between the device and the respective service without an ongoing dependency to the security service or other services. In some cases, multiple root keys may be established based on a successful authentication and key agreement procedure. Each root key may correspond to a different network, and the network may be any type of network, such as a home network, a visited network, a logical network, a physical network, any combination thereof, and the like. Network specific root keys may be derived from the root key established between the device and the home network.

In some cases, a DU service key $K_{DU}$ 608 for use between the DU 620 and the device may also be derived based on the root key $K_{SECSVC}$ 602. In some cases, the DU 620 may be considered as another service of the wireless system. In some cases, the DU 620 may host other services, such as a MAC security and/or PHY security. The DU 620 may establish a DU specific key hierarchy for services hosted by the DU 620 to protect communications with the device. The MAC security and PHY security may be configured by the DU 620 and the key for MAC encryption $K_{MACEnc}$ 610 and key for MAC integrity $K_{MACInt}$ 612 may be derived from the DU service key $K_{DU}$ 608. In some cases, PHY security keys may be derived in a manner similar to MAC security key derivation.

Figure 7:
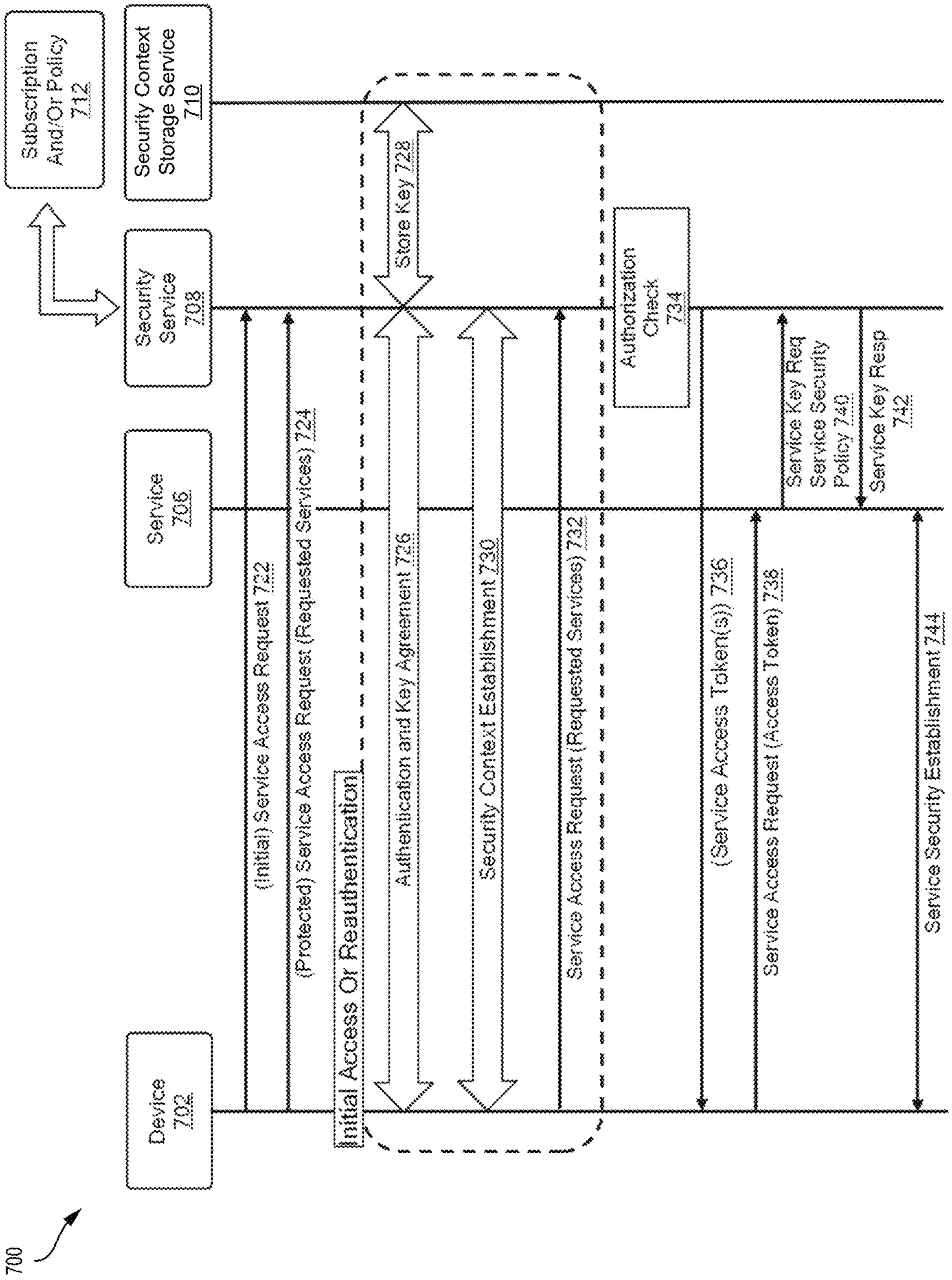
FIG. 7 is a call flow diagram illustrating a technique for securely accessing a service on a wireless system, in accordance with aspects of the present disclosure.

FIG. 7 is a call flow diagram illustrating a technique for securely accessing a service 700 on a wireless system, in accordance with aspects of the present disclosure. The wireless system illustrated in FIG. 7 includes a device 702, DU 704, service 706, security service 708, and security context storage service 710. The device 702 may be substantially similar to device 502 of FIG. 5. DU 704 may be substantially similar to DU 504 of FIG. 5, service 706 may be any horizontal or vertical service except the security service 708 and security context storage service 710, security service 708 may be substantially similar to security service 514 of FIG. 5, and the security context storage service 710 may be substantially similar to the security context storage service 518 of FIG. 5.

In some cases, when the device 702 attempts to establish a connection with services of the wireless system, the device 702 may send an initial service access request 722 to the security service 708. In some cases, the initial service access request 722 may be unprotected as no security context has yet been established between the device 702 and the security service 708. In cases where the device 702 has previously established a security context with the security service 708, and wants to reauthenticate (e.g., after coming out of idle mode, reregistering, etc.), the device 702 may send a protected service access request 724 to establish a security context with one or more services of the wireless system. The protected service access request 724 may be sent using the previously established security context between the device 702 and the security service 708 and is thus protected. In some cases, as the protected service access request 724 is protected, the protected service access request 724 may include additional parameters and/or data as compared to the initial service access request 722. For example, the protected service access request 724 may include an indication of the requested services, subscription identifier, etc.

In cases where the device 702 transmits the initial service access request 722, the device 702 and security service 708 may perform authentication and key agreement procedure 726 using, for example, an authentication and key agreement protocol, to generate a session root key between the device 702 and security service 708. After receiving the initial service access request 722 or protected service access request 724, the security service 708 may perform an authentication and key agreement procedure 726. In some cases, the authentication and key agreement procedure 726 may use a long-term credential type authentication and key agreement protocol such as 6G AKA, Extensible Authentication Protocol Method for 3rd Generation Authentication and Key Agreement (EAP-AKA), and the like. The session root key may be stored 728 in the security context storage service 710. As indicated above, the security context storage service 710 may be implemented as a service and separated from the security service 708. The security context storage service 710 may not be exposed (e.g., visible) to other services and/or the device 702. In some cases, the security context storage service 710 may be accessible through the security service 708, for example, by requesting a stored service key.

In some cases, the session root key may be used to establish a main security context 730 (e.g., perform a security context establishment procedure) between the device 702 and the security service 708. Establishing the main security context 730 may be performed using a service establishment protocol such as a NAS security mode command procedure, a transport layer security (TLS) service establishment protocol, and the like. Once the main security context 730 is established, further communications between the device 702 and the wireless service may be based on the main security context. In cases where the device 702 transmits the initial service access request 722, the device 702 may, after establishing the main security context 730, transmit a service access request 732 requesting access to one or more services of the wireless system in a manner substantially similar to the protected service access request 724.

In some cases, the security service 708 may perform an authorization check 734 to determine what access the device 702 may have to the services 706 of the wireless system based on subscription and/or policy information 712. If the device 702 is authorized to access the requested services, the security services 708 may transmit 736 service key information to the device 702. In some cases, the service key information may include information for deriving the service key for the service. In some cases, the security service 708 may derive the service key based on the received service access request. In other cases, the security service 708 may retrieve the service key from a storage, such as the security context storage service 710, for example, if the device 702 has previously accessed the service 706. The security service 708 may send service key information for deriving the service key for the service as the service key may be derived based on information the device 702 has, such as the session root key, and a parameter, such as a service identifier. As the device 702 has the session root key, the security service 708 may provide the parameter to the device 702. The device may then derive the service key. In some cases, the service key information may include a service access token. The service access token may be sent along with, or instead of, the information for deriving the service key. As an example, the security service 708 may generate the service access token based on the session root key and transmit 736 the service access token to the device 702. The device 702 may obtain the service access token by decoding the transmission 736 using the session root key stored on the device 702. In cases where the service access request requests access to multiple services, service key information for multiple services may be provided to the device 702. In some cases, each service access token may correspond to a particular service of the wireless system, such as service 706.

The device 702 may transmit 738 a service access request to the service 706 the device 702 is attempting to access. In some cases, the service access request may be secured (e.g., encoded) based on the derived service access key. In some cases, the service access request may include a temporary identifier of the device 702, such as a globally unique temporary identifier (GUTI). This temporary identifier may be unsecured. In some cases, the service access request may include the service access token for the service 706. The service 706 may then transmit 740 a service key request and provide any service specific service security policy to the security service 708. In some cases, the service key request may include an identifier for the service and/or the temporary identifier for the device 702. The security service 708 may then respond by transmitting 742 the service key response to the service 706. In some cases, the security service 708 may also transmit 742 UE security capability information to the service 706. The service 706 may use the service key from the security service 708 to decrypt the service access request transmitted 738 from the device 702. If the service access request included the service access token, the service 706 may obtain the service access token.

In some cases, the service access token may be defined such that services of the wireless system may determine that the service access token is from the security service 708. The service 706 may verify that the service access token was created by the security service 708. The service access token may indicate that the device 702 is authorized to access the service 706 and based on verifying that the service access token was created by the security service, the service 706 may not need to perform another authorization check with the subscription and/or policy information 712. The service access token may be bound to an identity of the device, where the identity may be a subscription identifier, service-specific identifier, or the like. Additionally, as the service 706 can determine the device 702 is authorized based on the service access token, the service 706 may not have to obtain information from the device 702, such as a permanent identifier of the device 702, to perform an authorization check. The service 706 may then establish service specific security context 744 with the device 702 based on the service key.

Figure 8:
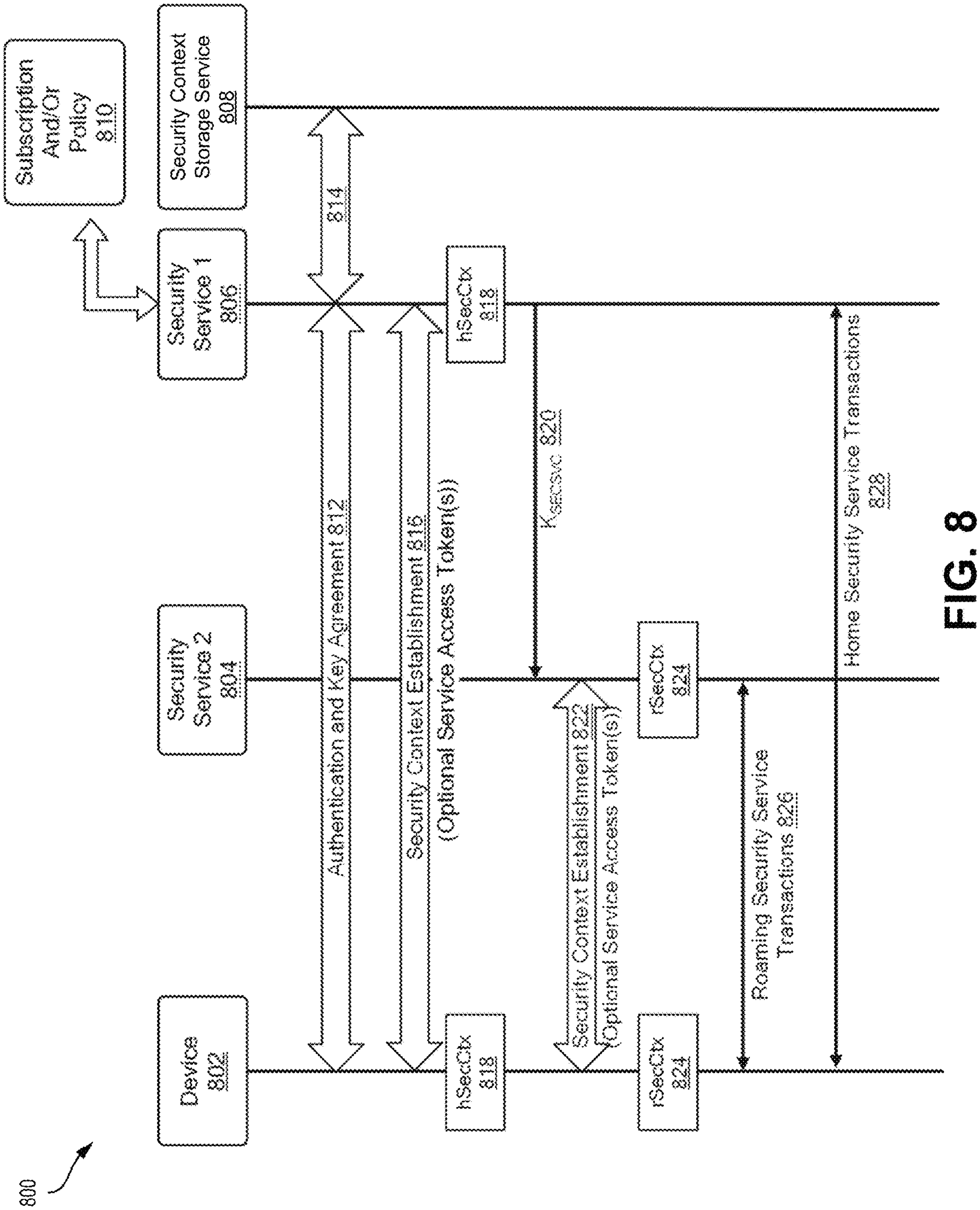
FIG. 8 is a call flow diagram illustrating a technique for secure access for roaming, in accordance with aspects of the present disclosure.

FIG. 8 is a call flow diagram illustrating a technique for secure access for roaming 800, in accordance with aspects of the present disclosure. FIG. 8 includes a device 802, a second security service 804 of a roaming wireless system, a first security service 806 of a home wireless system, and security context storage service 808. The device 802 may be substantially similar to device 502 of FIG. 5 and device 702 of FIG. 7, the first service security service 806 and second security service 804 may be substantially similar to security service 514 of FIG. 5 and security service 708 of FIG. 7, and the security context storage service 808 may be substantially similar to the security context storage service 518 of FIG. 5 and security context storage service 710 of FIG. 7.

In some cases, the device 802 may be configured to usually connect to the home wireless system, but may also roam to other wireless systems, such as the roaming wireless system. In FIG. 8, the device 802 may perform an authentication and key agreement procedure 812, store 814 a session root key, and perform a security context establishment procedure 816 to establish a home security context 818 (e.g., a security context with the home wireless system) with the first security service 806 of the home wireless system in a manner as discussed above with respect to FIG. 7.

In some cases, the device 802 may roam to another wireless system, such as the roaming wireless system. In some cases, the security services of the home wireless system and the roaming wireless system may be separate, and the UE may interact with these wireless systems separately to establish security contexts with the different wireless systems. In some cases, when roaming, rather than establishing a completely new security context with the roaming wireless system, it may be useful to establish the security context with the roaming wireless system based on the security context (e.g., based on the session root key) from the home wireless system. Establishing the security context of the roaming wireless system based on the security context of the home wireless system helps allow the device 802 to maintain a secure connection to the home security context 818 and allow for security service transactions 828 to the home wireless system while roaming on the roaming wireless system. This may also help provide secure access to services on the home network that may not be offered on the roaming network. Additionally, the device 802 would be able to have secure access to services on the home network without having to rely on security services of the roaming network. In some cases, a roaming network may be treated in a manner similar to a service and establishing a security context with a roaming network may be performed in a manner similar to establishing a security context with a service.

In some cases, the second security service 804 of the roaming wireless system may be considered as another service by the first security service 806 of the home wireless system. For example, if the device 802 roams to the roaming wireless system and attempts to establish a security context with the second security service 804 (e.g., via an initial service access request or protected service access request (not shown)), the device 802 may send a service access request to the first security service 806 to request roaming service (not shown) in a manner similar to transmitting the service access request 732 of FIG. 7. The first security service 806 may provide service key information for access a security service, such as the second security service 804. For example, the first security service 806 may provide service key information, which may include a service access token, for accessing the second security service 804 in a manner similar to transmitting 736 the service key information in FIG. 7. Alternatively, the first security service 806 may provide other information for accessing the second wireless system. Based on the other information and/or service access token, the device 802 may attempt to access the second security service 804 of the second wireless system in a manner similar to transmitting 738 a service access request in FIG. 7.

In response to a service access request, the second security service 804 may request a service key from the first security service 806 of the home wireless system in a manner similar to transmitting 740 a service key request in FIG. 7. In some cases, the authentication may be network initiated and the security service at the home wireless system or the roaming wireless system may trigger the authentication procedure. The first security service 806 of the home wireless system may generate the service key and transmit 820 the service key to the second security service 804 in a manner similar to transmitting 742 the service key response of FIG. 7.

The second security service 804 may receive the service key and use the service key as if it were a root key for the second security service 804. The second security service 804 and the device 802 may then perform a security context establishment procedure 822 in a manner as discussed above with respect to FIG. 7 to establish a roaming (e.g., visiting) security context 824 (e.g., a security context with the roaming (e.g., visiting) wireless system) with the second security service 804. The device 802 may then perform roaming security service transactions 826 with the second security service 804 of the roaming wireless system via the roaming security context 824 and separately perform home security service transactions with the first security service 806 of the home wireless system via the home security context 818. Thus, independent protection of the security services transactions for the home wireless system and the roaming wireless system may be provided.

In some cases, as a device may utilize multiple services with a per service security context, the device may be associated with multiple service security contexts. To help distinguish between the service security contexts and to help locate the service security context at the service, each service security context may be associated with a security context identifier (ID). In some cases, the security context ID may be a global unique temporary identifier (GUTI). This security context ID may be included in service requests to the service. The service may then use the security context ID to retrieve a corresponding security context for the device. In some cases, the security context ID may be refreshed periodically/semi-periodically/on-demand for privacy concerns, similar to a GUTI reallocation.

In some cases, a service (e.g., security service and/or other service) may, during the service security context establishment procedure, generate a security context cookie. This security context cookie may appear to be a binary blob that may be interpretable by the service, but not by other services or the UE. Additionally, the UE or other services may not be able to change the contexts of the security context cookie without making the security context cookie unusable/invalid (e.g., via a signature, hash, etc.). In some cases, the security context cookie may include any information (e.g., information about the security context, security context ID, security key, subscription/policy information, etc.) that may be useable/retrieved by the service (e.g., from the security context storage) when the device is using the service. The service may provide the security context cookie to the device as a part of the service security context establishment procedure. The device may store the security context cookie and then provide the security context cookie the next time the device attempts to access service. The service may use the information from the security context cookie to restore the service security context with the device. Providing the security context cookie to the device can help minimize an amount of context storage and/or security context management by the service.

Figure 9:
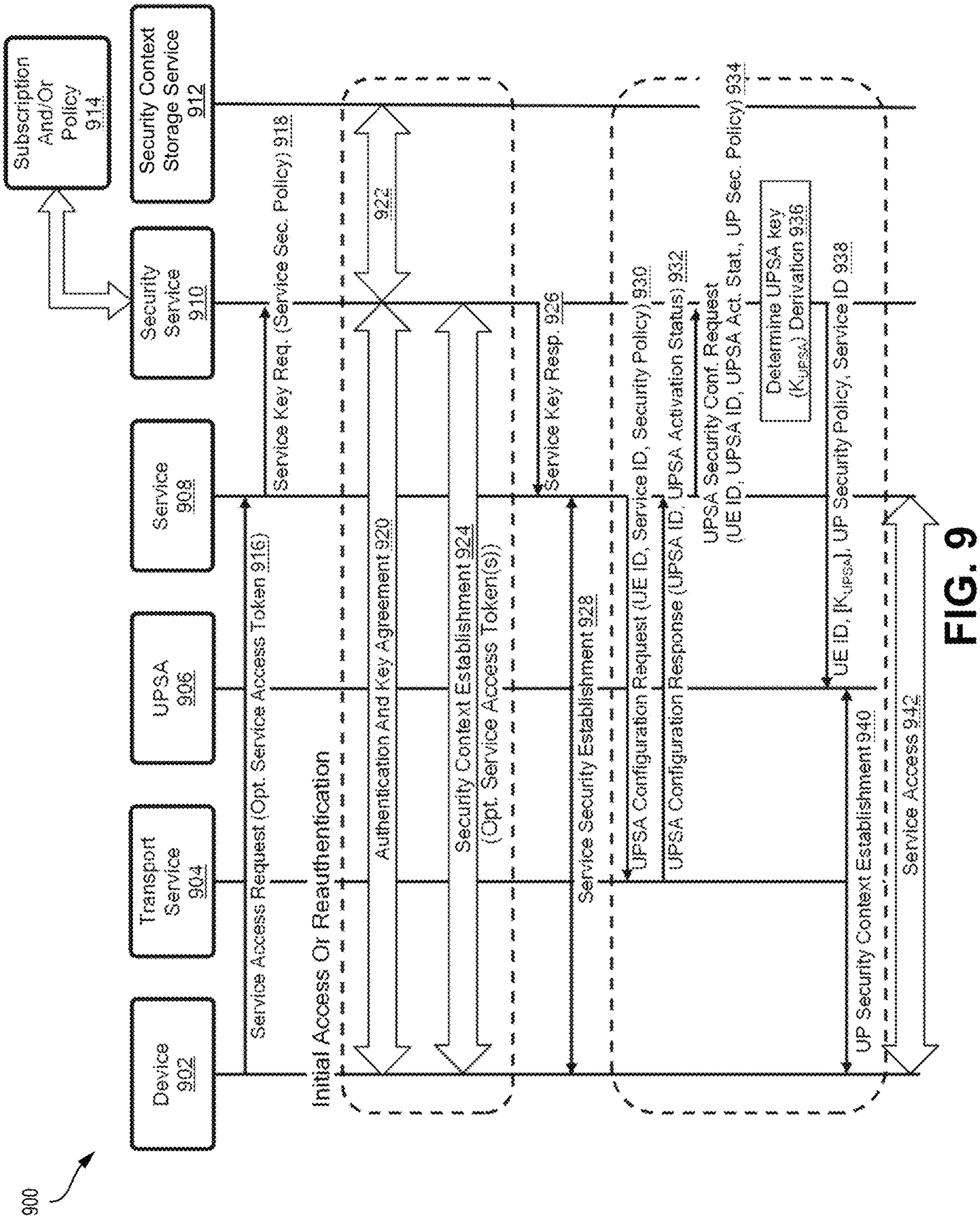
FIG. 9 is a call flow diagram illustrating a technique for user plane service security establishment 900, in accordance with aspects of the present disclosure.

FIG. 9 is a call flow diagram illustrating a technique for user plane service security establishment 900, in accordance with aspects of the present disclosure. FIG. 9 includes a device 902, a transport service 904, a UPSA 906, a user plane service 908, a security service 910, and a security context storage 912. The device 902 may be substantially similar to device 502 of FIG. 5, device 702 of FIG. 7, and device 802 of FIG. 8. The transport service 904 may be substantially similar to transport service 510 of FIG. 5. The service 908 may be a user plane service, such as service 528-536 of FIG. 5. The security service 910 may be substantially similar to security service 514 of FIG. 5 and security service 708 of FIG. 7. The security context storage 912 may be substantially similar to the security context storage service 518 of FIG. 5, security context storage service 710 of FIG. 7, and security context storage service 808 of FIG. 8.

In some cases, when the device 902 attempts to establish a connection with a user plane service of the wireless system, the device 902 may send a service access request 916 to the service 908 of the wireless network. In some cases, the service access request 916 may include a service access token (e.g., if the device 902 previously established a security context with the security service 910 and obtained service access tokens). In other cases, the service access request may include a temporary identifier of the device 902, such as a globally unique temporary identifier (GUTI) of the device 902 attempting to access the service 908. In some cases, the service access request 916 may be similar to the transmitted 738 service access request of FIG. 7. Based on the received service access request 916, the service may transmit 918 a service key request and provide any service specific service security policy to the security service 910. The service key request may be substantially similar to the service key request transmitted 740 in FIG. 7.

The service security policy may indicate what kind of security may be used, such as whether UPSA security should be used. The service security policy may also indicate where the UPSA 906 for the service 908 is/should be located. In cases where the service 908 is associated with relatively high mobility devices, the UPSA 906 may be located deeper inside the wireless system (e.g., near the core network/user plane services/etc.), rather than near edges of the wireless system (e.g., near the gNodeB/eNodeB/DU/CU/etc.) to help avoid frequent key changes due to mobility. In cases where the service 908 is associated with relatively low mobility devices, or if latency is especially important for the service, the UPSA 906 may be located closer to an edge of the wireless system rather than deeper in the wireless system.

In cases where the device 902 has not previously established a security context with the service 908 or is performing a reauthentication procedure, the device 902 and security service 910 may perform authentication and key agreement procedure 920 using, for example, an authentication and key agreement protocol, to generate a session root key between the device 902 and security service 910 in a manner similar to that described above with respect to FIG. 7. In some cases, the authentication and key agreement procedure 920 may use a long-term credential type authentication and key agreement protocol such as 6G AKA, Extensible Authentication Protocol Method for 3rd Generation Authentication and Key Agreement (EAP-AKA), and the like. The session root key may be stored 922 in the security context storage 912. The device 902 and the security service 910 may then establish 924 a security context. In some cases, the security service 910 may provide the device 902 one or more service access tokens, as discussed above with respect to FIG. 7. In some cases, if the security context was previously established with the security service 910 (e.g., where a valid access token was provided with the service access request 916), the authentication and key agreement procedure 920, storing 922 the session root key, and establishing 924 the security context with the security service 910 may be skipped.

After security context establishment with the security service 910, the security service 910, in response to the transmitted 918 service key request from the service 908, may transmit 926 a service key response, including the service key derived from the session root key, to the service 908. The service 908 may then establish 928 a service specific security context with the device 902 based on the service key. In some cases, the service 908 may transmit the service security policy to the device 902, for example, as a part establishing 928 the service specific security context. In some cases, the service security policy may indicate that UPSA security may be used for the service 908.

In some cases, based on the service security policy, the service 908 may also establish a user plane security context. To establish the user plane security context, the service 908 may transmit 930 a UPSA configuration request to the transport service 904. In some cases, the UPSA configuration request may include an identifier for the device 902 (e.g., GUTI, other common identifier, temporary identifier for the device 902 for the service 908, etc.), a service identifier (e.g., identifier associated with the service), and the service security policy. The security policy may indicate where the UPSA 906 may be located. The UPSA configuration request may indicate to the transport service 904 to help set up a channel secured by user plane security with the UPSA 906. The transport service 904 may select a UPSA 906 based on the service security policy. The transport service 904 may transmit 932 a UPSA configuration response back to the service 908 in response to the UPSA configuration request. The UPSA configuration response may include an identifier for the selected UPSA 906 (e.g., UPSA termination point identifier) and UPSA activation status information. The UPSA activation status information may indicate whether user plane security has already been established (e.g., activated) between the service 908 and the device 902 (e.g., by another service, such as for a UPSA 906 shared between multiple services). The service may then transmit 934 a UPSA security configuration request to the security service 910 for a UPSA key to configure the user plane security. The UPSA security configuration request may include the device identifier, UPSA identifier, UPSA activation status information, and user plane security policy. In some cases, the user plane security policy may include information about user plane encryption, user plane integrity protection, or any combination thereof. In some cases, the user plane security policy may be obtained based on the service security policy. In other cases, the user plane security policy may be obtained by the security service 910 from a subscription and/or policy service 914 accessible to the security service 910. In some cases, the security service 910 may determine (e.g., based on the user plane security policy and UPSA activation status information) whether user plane security should be activated, or if already activated, whether a new key for the user plane security should be issued. If the security service 910 determines that a new key does not need to be issued, the security service may allow the user plane security context between the device 902 and UPSA 906 to continuing using an existing key. If the security service 910 determines that a new key should be issued, then the security service may derive a new UPSA key.

Based on the received UPSA security configuration request (e.g., the UPSA ID), the security service 910 may derive 936 a UPSA key $K_{UPSA}$ that may be used to establish (or refresh) the user plane security context. In some cases, the UPSA key $K_{UPSA}$ (e.g., $K_{UPSA}$ 614 of FIG. 6) may be derived from the session root key (e.g., $K_{SECSVC}$ 602) and UPSA identifier as described above with respect to FIG. 6. In some cases, the UPSA key $K_{UPSA}$ may be derived using the key derivative function along with the session root key (e.g., $K_{SECSVC}$ 602), UPSA identifier, service identifier, and a freshness parameter. The UPSA identifier may be any identifier for the UPSA 906, such as an identifier number, IP address, etc. Similarly, the service identifier may be any identifier for the service 908. In some cases, the freshness parameter may be a random number. The freshness parameter may be chosen, for example, by the security service 910, and the freshness parameter may be indicated to the device 902 by the UPSA 906 during UPSA user plane security establishment 940.

The security service 910 may then transmit 938 the device identifier, UPSA key $K_{UPSA}$, user plane security policy, and service identifier to the UPSA 906. In some cases, such as if the user plane security has already been established, the UPSA key $K_{UPSA}$ may be omitted as the UPSA 906 and device 902 already have the UPSA key $K_{UPSA}$. In some cases, the user plane security policy may be included as the UPSA 906 may support different types of security (e.g., privacy, integrity protection, etc.) and different services may use different types of security. In some cases, the user plane security policy may be omitted, for example, if the service uses a default type of security, the UPSA 906 only supports a single type of security, etc. Based on the device identifier, UPSA key $K_{UPSA}$, and service identifier, the UPSA 906 and device 902 may establish 940 the user plane security context according to the user plane security policy. In some cases, the security context between the UPSA 906 and the device 902 may be established in a manner similar to establishing 928 a security context between the device 902 and the service 908. Access 942 to the service 908 via the UPSA 906 and transport service 904 may then be performed. In some cases, during service security establishment 928, the device 902 may receive the service security policy from the service 908. The service security policy may include UPSA configuration information indicating whether the device may establish user plane security with the UPSA.

Figure 10:
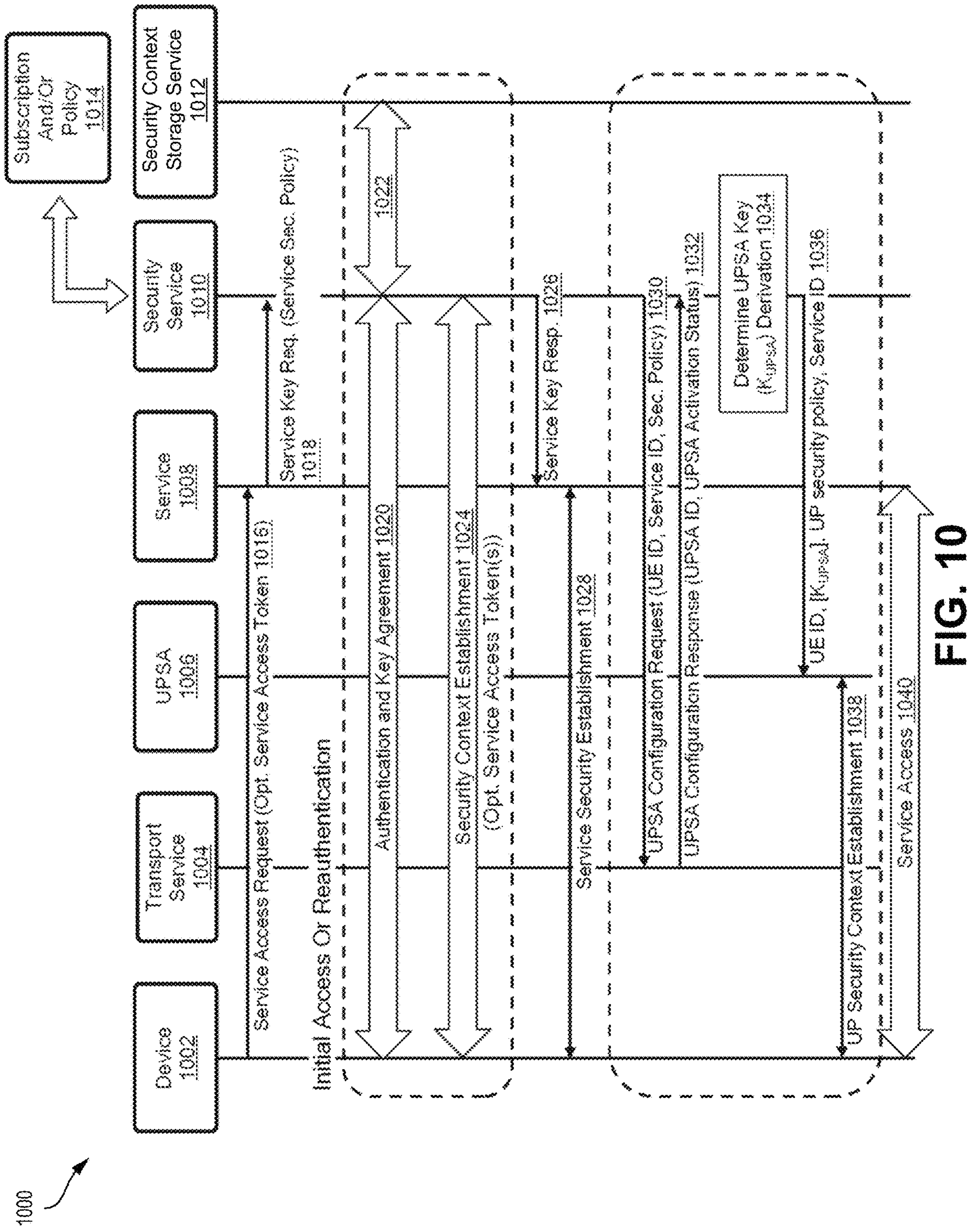
FIG. 10 is a call flow diagram illustrating an alternate technique for user plane service security establishment 1000, in accordance with aspects of the present disclosure.

FIG. 10 is a call flow diagram illustrating an alternate technique for user plane service security establishment 1000, in accordance with aspects of the present disclosure. FIG. 10 includes similar components as FIG. 9, including a device 1002, a transport service 1004, a UPSA 1006, a user plane service 1008, a security service 1010, and a security context storage 1012. Similarly named components may be substantially similar to those discussed above with respect to FIG. 9. In FIG. 10, the device 1002 may transmit 1016 a service access request to the service 1008, which, in response, transmits 1018 a service key request to the security service 1010 in a manner substantially similar to that discussed with respect to FIG. 9. If needed, an authentication and key agreement procedure 1020, storage 1022 of a resulting session root key, establishing 1024 a security context with the security service 1010, transmitting 926 a service key response, and establishing 1028 a service security context may be performed in substantially the same way as discussed above with respect to FIG. 9.

After (or in parallel to) the service specific security context is established 1028 between the device 1002 and the service 1008, the security service 1010 may prepare a UPSA key $K_{UPSA}$ for establishing a user plane security context. In this example, the security service 1010 may transmit 1030 a UPSA configuration request to the transport service 1004. In some cases, the UPSA configuration request may be substantially similar to that discussed above with respect to FIG. 9. The transport service 1004, in reply, may transmit 1032 a UPSA configuration response back to the security service 1008 in a manner substantially similar to that discussed above with respect to FIG. 9.

In some cases, the UPSA configuration response may indicate that a user plane security context between the UPSA 1006 and the device 1002 has not yet been established and thus a UPSA key is needed. Based on the received UPSA security configuration response (e.g., the UPSA ID) from the transport service 1004, the security service 1010 may derive 1034 a UPSA key $K_{UPSA}$ that may be used to establish the user plane security context. In some cases, the UPSA key $K_{UPSA}$ may be derived from the session root key as described above with respect to FIG. 6. The security service 1010 may then transmit 1036 the device identifier, UPSA key $K_{UPSA}$, user plane security policy, and service identifier to the UPSA 1006. In some cases, the user plane security policy may be obtained based on the service security policy. In other cases, the user plane security policy may be obtained by the security service 1010 from a subscription and/or policy service 1014 accessible to the security service 1010. As discussed above, in some cases the UPSA key $K_{UPSA}$ and/or service security policy may be omitted. Based on the device identifier, UPSA key $K_{UPSA}$, and service identifier, the UPSA 1006 and the device 1002 may establish 1038 the user plane security context according to the service security policy. In some cases, the security context between the UPSA 1006 and the device 1002 may be established in a manner similar to establishing 1028 a security context between the device 1002 and the service 1008. Access 1040 to the service 1008 via the UPSA 1006 and transport service 1004 may then be performed. Thus, in FIG. 10, setup of the user plane security context is largely directed by the security service 1010, whereas in FIG. 9, the service 908 directs the setup of the user plane security context.

Figure 11:
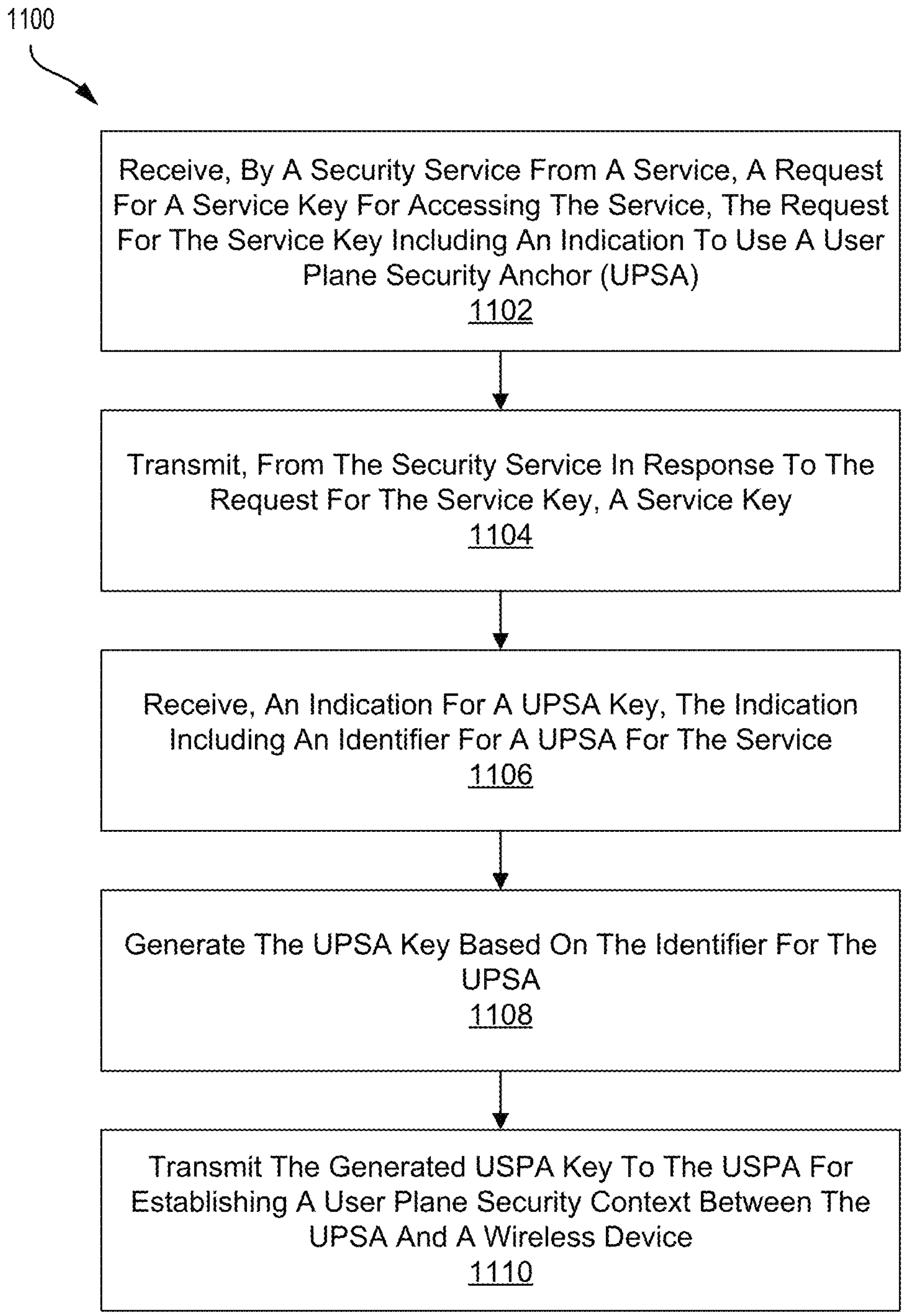
FIG. 11 is a flow diagram illustrating a process for securely accessing a service, in accordance with aspects of the present disclosure.

FIG. 11 is a flow diagram illustrating a process 1100 for securely accessing a service, in accordance with aspects of the present disclosure. The process 1100 can be performed by a component or system (e.g., a chipset, server, device, etc.) of a wireless network (e.g., BS 102, mmW BS 180, core network 170 of FIG. 1, core network 320, SMO Framework 305, O0eNB 311, RIC 325, O-Cloud 390, CU 310, security service 514 of FIG. 5, security service 708 of FIG. 7, security service 1 806 of FIG. 8, security service 910 of FIG. 9, security service 1008 of FIG. 10, and computing system 1400 of FIG. 14). The wireless device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device (e.g., UE 104, of FIGS. 1 and 2, respectively, wireless device 407 of FIG. 4, device 502 of FIG. 5, device 702 of FIG. 7, device 802 of FIG. 8, device 902 of FIG. 9, device 1002 of FIG. 10, and computing system 1400 of FIG. 14, etc.). The operations of the process 1100 may be implemented as software components that are executed and run on one or more processors (e.g., processor 1410 of FIG. 14 or other processor(s)). Further, the transmission and reception of signals by the wireless network (or component of the wireless network, such as the security service) in the process 1100 may be enabled, for example, by one or more antennas (e.g., antennas 234 of FIG.) and/or one or more transceivers (e.g., modulators/demodulators 232, TX MIMO processor 230, MIMO detector 236, transmit processor 220, receive processor 238 of FIG. 2, etc.).

At block 1102, the computing device (or component thereof) may receive, by a security service (e.g., security service 910 of FIG. 9, security service 1008 of FIG. 10) from a service (e.g., service 908 of FIG. 9, service 1008 of FIG. 10), a request for a service key for accessing the service (e.g., based on transmission 918 of FIG. 9, transmission 1018 of FIG. 10), the request for the service key including an indication to use a user plane security anchor (UPSA) (e.g., UPSA 526 of FIG. 5, UPSA 906 of FIG. 9, UPSA 1006 of FIG. 10). In some cases, the request for the service key includes an identifier for the wireless device and an identifier for the service. For example, the service key request may include an identifier for the service and/or the temporary identifier for the device. In some cases, the identifier for the wireless device comprises a temporary identifier. In some cases, the computing device (or component thereof may derive the service key for accessing the service by the wireless device and transmit, from the security service and to the wireless device, service key information for accessing the service.

At block 1104, the computing device (or component thereof) may transmit, from the security service in response to the request for the service key, a service key response (e.g., transmission 926 of FIG. 9, transmission 1026 of FIG. 10) including the service key.

At block 1106, the computing device (or component thereof) may receive an indication for a UPSA key (e.g., in transmission 934 of FIG. 9, transmission 1032 of FIG. 10), the indication including an identifier for a UPSA for the service. In some cases, the indication for the UPSA key is received from the service (e.g., transmission 934 of FIG. 9). In some examples, the indication for the UPSA key includes an identifier for the wireless device (e.g., UE ID, device identifier, etc.). In some cases, the indication for the UPSA key comprises an indication that the UPSA is not active for the service and the wireless device. In some examples, the indication to use the UPSA comprises a service security policy. In some cases, the computing device (or component thereof) may transmit a configuration request (e.g., transmission 1030 of FIG. 10) to a transport service to select a UPSA for the service. In some cases, the indication for a UPSA key is received from the transport service (e.g., transmission 1032 of FIG. 10). In some examples, the configuration request includes the identifier for the wireless device, the identifier for the service, and the service security policy. In some cases, the UPSA for the service is selected based on the identifier for the wireless device, the identifier for the service, and the service security policy.

At block 1108, the computing device (or component thereof) may generate the UPSA key (e.g., derivation 936 of FIG. 9, derivation 1034 of FIG. 10) based on the identifier for the UPSA.

At block 1110, the computing device (or component thereof) may transmit (e.g., transmission 938 of FIG. 9, transmission 1036 of FIG. 10) the generated UPSA key to the UPSA for establishing a user plane security context between the UPSA and a wireless device.

Figure 12:
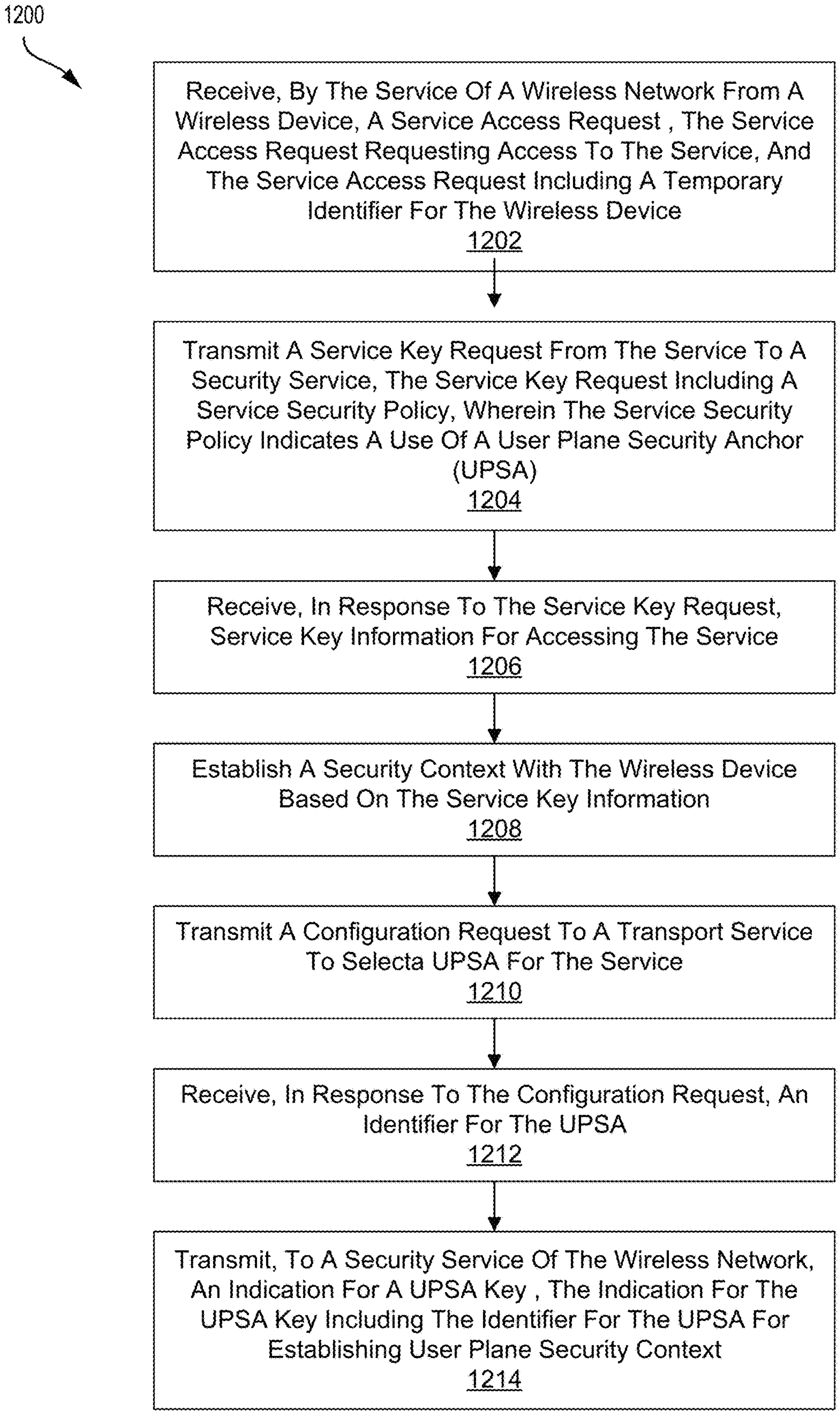
FIG. 12 is a flow diagram illustrating a process for securely accessing a service, in accordance with aspects of the present disclosure.

FIG. 12 is a flow diagram illustrating a process 1200 for securely accessing a service, in accordance with aspects of the present disclosure. The process 1200 can be performed by a component or system (e.g., a chipset, server, device, etc.) of a wireless network (e.g., BS 102, mmW BS 180, core network 170 of FIG. 1, core network 320, SMO Framework 305, O0eNB 311, RIC 325, O-Cloud 390, CU 310, vertical services 524 of FIG. 5, horizontal service 520 of FIG. 5, service 908 of FIG. 9, and computing system 1400 of FIG. 14). The wireless device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device (e.g., UE 104, of FIGS. 1 and 2, respectively, wireless device 407 of FIG. 4, device 502 of FIG. 5, device 702 of FIG. 7, device 802 of FIG. 8, device 902 of FIG. 9, and computing system 1400 of FIG. 14, etc.). The operations of the process 1200 may be implemented as software components that are executed and run on one or more processors (e.g., processor 1410 of FIG. 14 or other processor(s)). Further, the transmission and reception of signals by the wireless network (or component of the wireless network, such as the security service) in the process 1200 may be enabled, for example, by one or more antennas (e.g., antennas 234 of FIG.) and/or one or more transceivers (e.g., modulators/demodulators 232, TX MIMO processor 230, MIMO detector 236, transmit processor 220, receive processor 238 of FIG. 2, etc.).

At block 1202, the computing device (or component thereof) may receive, by the service (e.g., service 908 of FIG. 9) of a wireless network from a wireless device, a service access request, the service access request (e.g., service access request 916 of FIG. 9) requesting access to the service, and the service access request including a temporary identifier for the wireless device.

At block 1204, the computing device (or component thereof) may transmit a service key request from the service to a security service (e.g., transmission 918 of FIG. 9, transmission 1018 of FIG. 10), the service key request including an indication to use a user plane security anchor (UPSA) (e.g., UPSA 526 of FIG. 5, UPSA 906 of FIG. 9). In some cases, the service key request includes the temporary identifier for the wireless device and an identifier for the service. For example, the service key request may include an identifier for the service and/or the temporary identifier for the device. In some cases, the indication to use the UPSA comprises a service security policy.

At block 1206, the computing device (or component thereof) may receive, in response to the service key request, service key information for accessing the service (e.g., transmission 926 of FIG. 9).

At block 1208, the computing device (or component thereof) may establish a security context with the wireless device based on the service key information (e.g., establishment 928 of FIG. 9).

At block 1210, the computing device (or component thereof) may transmit a configuration request to a transport service to select a UPSA for the service (e.g., transmission 930 of FIG. 9). In some cases, the configuration request includes the identifier for the wireless device, the identifier for the service, and the service security policy. In some cases, the UPSA is selected based on the identifier for the wireless device, the identifier for the service, and the service security policy.

At block 1212, the computing device (or component thereof) may receive, in response to the configuration request, an identifier for the UPSA (e.g., in transmission 932 of FIG. 9). In some cases, the identifier for the UPSA is received from the transport service (e.g., in transmission 932 of FIG. 9).

At block 1214, the computing device (or component thereof) may transmit (e.g., transmission 934 of FIG. 9), to a security service of the wireless network, an indication for a UPSA key, the indication for the UPSA key including the identifier for the UPSA for establishing user plane security context. In some cases, the indication for the UPSA key further includes the temporary identifier for the wireless device and the service security policy.

Figure 13:
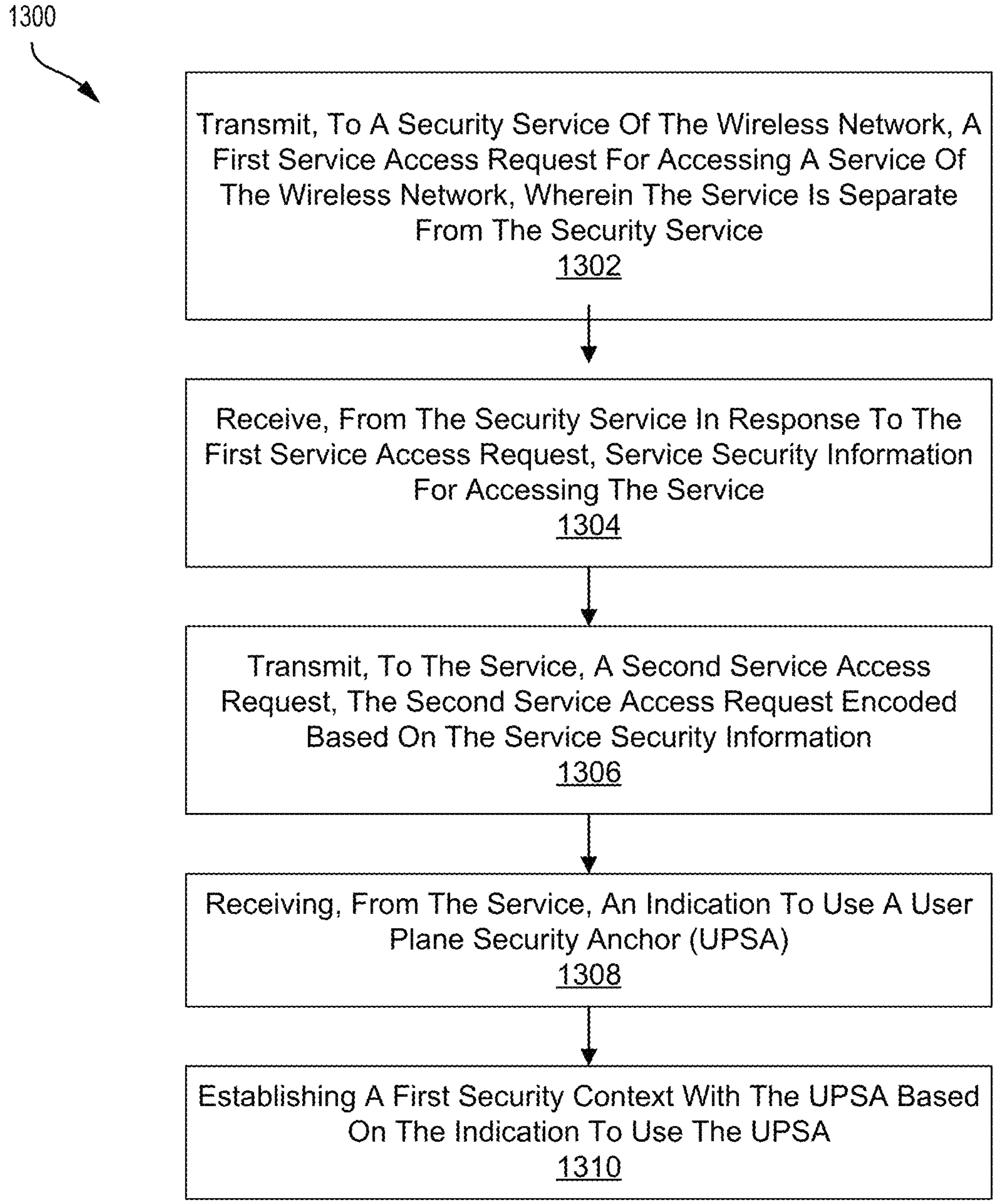
FIG. 13 is a flow diagram illustrating a process for securely accessing a service by a device, in accordance with aspects of the present disclosure.

FIG. 13 is a flow diagram illustrating a process 1300 for securely accessing a service, in accordance with aspects of the present disclosure. The process 1300 can be performed by a component or system (e.g., a chipset) of a wireless device (e.g., UE 104, of FIGS. 1 and 2, respectively, wireless device 407 of FIG. 4, device 502 of FIG. 5, device 902 of FIG. 9, device 1002 of FIG. 10, and computing system 1400 of FIG. 14). The operations of the process 1100 may be implemented as software components that are executed and run on one or more processors (e.g., processor 1410 of FIG. 14 or other processor(s)). Further, the transmission and reception of signals in the process 1300 may be enabled, for example, by one or more antennas (e.g., antennas 252 of FIG. 2, antenna 487 of FIG. 4) and/or one or more transceivers (e.g., wireless transceiver(s) 478 of FIG. 4), and may be performed over a wired or wireless medium.

At block 1302, the computing device (or component thereof) may transmit, to a security service (e.g., security service 708 of FIG. 7, security service 806 of FIG. 8, security service 910 of FIG. 9, security service 1010 of FIG. 10) of the wireless network, a first service access request (e.g., initial service access request 722, service access request 724 of FIG. 7) for accessing a service (e.g., horizontal service 520, vertical services 524 of FIG. 5, service 706 of FIG. 7, service 908 of FIG. 9, service 1008 of FIG. 10) of the wireless network, wherein the service is separate from the security service (e.g., security service 514 of FIG. 5, security service 910 of FIG. 9, security service 1008 of FIG. 10).

At block 1304, the computing device (or component thereof) may receive, from the security service in response to the first service access request, service security information (e.g., service security information transmission 736 of FIG. 7) for accessing the service. In some cases, the computing device (or component thereof) may perform an authentication and key agreement procedure (e.g., authentication and key agreement procedure 726 of FIG. 7, authentication and key agreement procedure 920 of FIG. 9, authentication and key agreement procedure 1020 of FIG. 10) to generate a session root key (e.g., $K_{SECSVC}$ 602 of FIG. 6) and establish a third security context with the security service (e.g., establishment 730 of FIG. 7, establishment 924 of FIG. 9, establishment 1024 of FIG. 10) based on the session root key.

At block 1306, the computing device (or component thereof) may transmit, to the service, a second service access request (e.g., transmission 738 of FIG. 7), the second service access request encoded based on the service security information. In some cases, the computing device (or component thereof) may establish (e.g., establishment 928 of FIG. 9, establishment 1028 of FIG. 10) a second security context with the service based on the service security information.

At block 1308, the computing device (or component thereof) may receive, from the service, an indication to use a user plane security anchor (UPSA) (e.g., as a part of establishing 928, 1028 of FIGS. 9 and 10, respectively, a service specific security context). In some cases, the indication to use the UPSA comprises a service security policy.

At block 1310, the computing device (or component thereof) may establish (e.g., establishment 940 of FIG. 9, establishment 1038 of FIG. 10) a first security context with the UPSA based on the indication to use the UPSA.

Figure 14:
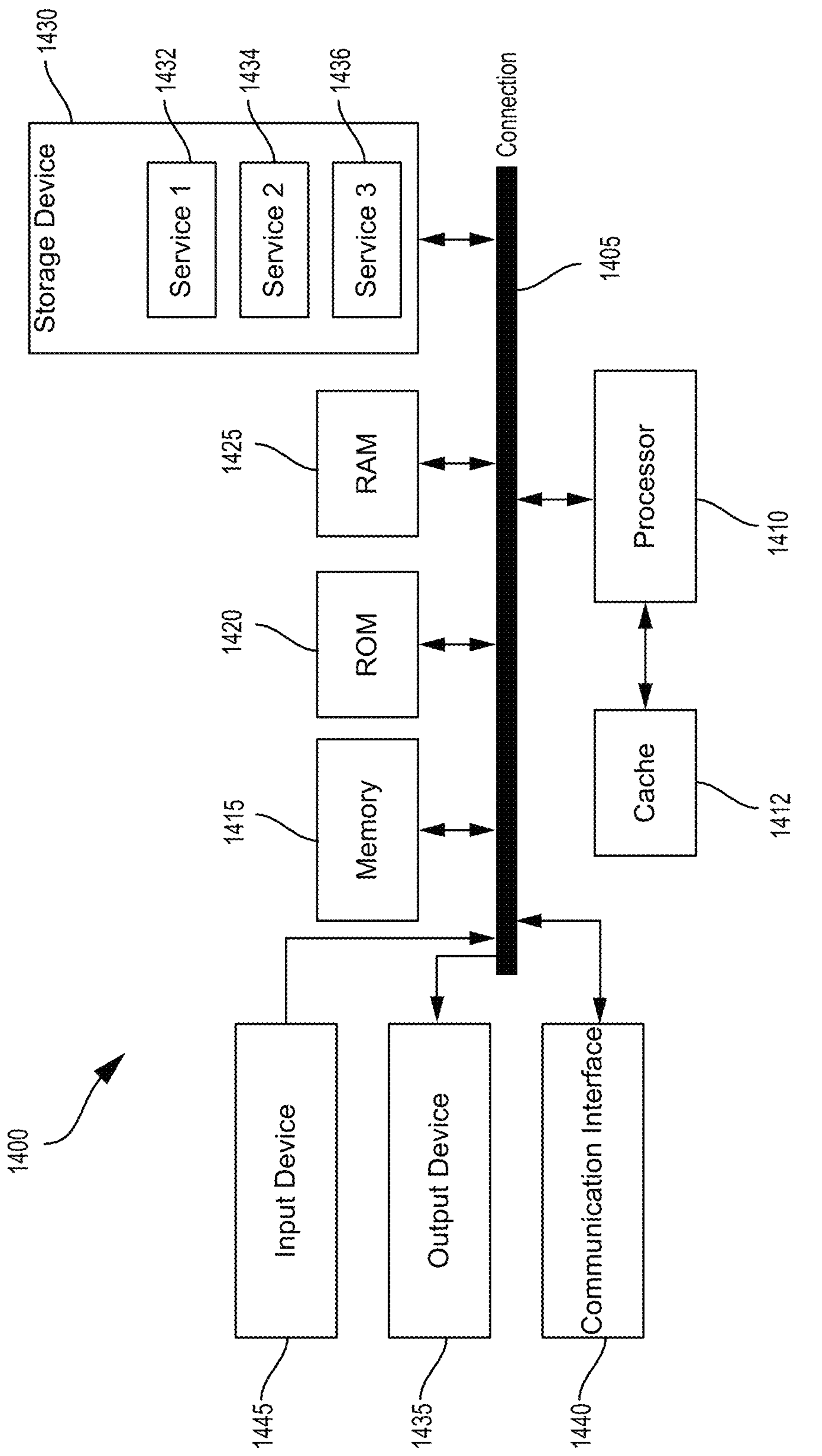
FIG. 14 is a diagram illustrating an example of a system for implementing certain aspects of the present technology.

FIG. 14 is a diagram illustrating an example of a system for implementing certain aspects of the present technology. In particular, FIG. 14 illustrates an example of computing system 1400, which may be for example any computing device making up internal computing system, a remote computing system, a camera, or any component thereof in which the components of the system are in communication with each other using connection 1405. Connection 1405 may be a physical connection using a bus, or a direct connection into processor 1410, such as in a chipset architecture. Connection 1405 may also be a virtual connection, networked connection, or logical connection.

In some embodiments, computing system 1400 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1400 includes at least one processing unit (CPU or processor) 1410 and connection 1405 that communicatively couples various system components including system memory 1415, such as read-only memory (ROM) 1420 and random access memory (RAM) 1425 to processor 1410. Computing system 1400 may include a cache 1412 of high-speed memory connected directly with, in close proximity to, or integrated as part of processor 1410.

Processor 1410 may include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which may represent any number of input mechanisms, such as a microphone for speech, a touch-sensitive screen for gesture or graphical input, keyboard, mouse, motion input, speech, etc. Computing system 1400 may also include output device 1435, which may be one or more of a number of output mechanisms. In some instances, multimodal systems may enable a user to provide multiple types of input/output to communicate with computing system 1400.

Computing system 1400 may include communications interface 1440, which may generally govern and manage the user input and system output. The communication interface may perform or facilitate receipt and/or transmission wired or wireless communications using wired and/or wireless transceivers, including those making use of an audio jack/ plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1430 may include software services, servers, services, etc., that when the code that defines such software is executed by the processor 1410, it causes the system to perform a function. In some embodiments, a hardware service that performs a particular function may include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed by one or more processors, performs one or more of the methods, algorithms, and/or operations described above. The computer-readable data storage medium may form part of a computer program product, which may include packaging materials. The computer-readable medium and/or memory system may include any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 615, read-only memory (ROM) 620, random access memory (RAM) 625, storage device 630, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C. A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method for securely accessing a service, comprising: receiving, by a security service from a service, a request for a service key for accessing the service, the request for the service key including an indication to use a user plane security anchor (UPSA); transmitting, from the security service in response to the request for the service key, a service key response including the service key; receiving an indication for a UPSA key, the indication including an identifier for a UPSA for the service; generating the UPSA key based on the identifier for the UPSA; and transmitting the generated UPSA key to the UPSA for establishing a user plane security context between the UPSA and a wireless device.

Aspect 2. The method of Aspect 1, wherein the request for the service key includes an identifier for the wireless device and an identifier for the service.

Aspect 3. The method of Aspect 2, further comprising transmitting a configuration request to a transport service to select a UPSA for the service.

Aspect 4. The method of Aspect 3, wherein the indication for a UPSA key is received from the transport service.

Aspect 5. The method of any of Aspects 3-4, wherein the indication to use the UPSA comprises a service security policy.

Aspect 6. The method of Aspect 5, wherein the configuration request includes the identifier for the wireless device, the identifier for the service, and the service security policy.

Aspect 7. The method of Aspect 6, wherein the UPSA for the service is selected based on the identifier for the wireless device, the identifier for the service, and the service security policy.

Aspect 8. The method of any of Aspects 2-7, wherein the UPSA key is generated based on a session root key associated with the wireless device and the identifier for the service.

Aspect 9. The method of any of Aspects 2-7, wherein the identifier for the wireless device comprises a temporary identifier.

Aspect 10. The method of any of Aspects 1-9, wherein the indication for the UPSA key is received from the service, and wherein the indication for the UPSA key includes an identifier for the wireless device.

Aspect 11. The method of any of Aspects 1-10, further comprising: deriving the service key for accessing the service by the wireless device; and transmitting, from the security service and to the wireless device, service key information for accessing the service.

Aspect 12. The method of any of Aspects 1-11, wherein the indication for the UPSA key comprises an indication that the UPSA is not active for the service and the wireless device.

Aspect 13. A method for securely accessing a service comprising: receiving, by the service of a wireless network from a wireless device, a service access request, the service access request requesting access to the service, and the service access request including a temporary identifier for the wireless device; transmitting a service key request from the service to a security service, the service key request including an indication to use a user plane security anchor (UPSA); receiving, in response to the service key request, service key information for accessing the service; establishing a security context with the wireless device based on the service key information; transmitting a configuration request to a transport service to select a UPSA for the service; receiving, in response to the configuration request, an identifier for the UPSA; and transmitting, to a security service of the wireless network, an indication for a UPSA key, the indication for the UPSA key including the identifier for the UPSA for establishing user plane security context.

Aspect 14. The method of Aspect 13, wherein the service key request includes the temporary identifier for the wireless device and an identifier for the service.

Aspect 15. The method of any of Aspects 13-14, wherein the identifier for the UPSA is received from the transport service.

Aspect 16. The method of any of Aspects 13-15, wherein the indication to use the UPSA comprises a service security policy Aspect 17. The method of Aspect 16, wherein the indication for the UPSA key further includes the temporary identifier for the wireless device and the service security policy.

Aspect 18. The method of any of Aspects 16-17, wherein the configuration request includes the identifier for the wireless device, the identifier for the service, and the service security policy.

Aspect 19. The method of Aspect 18, wherein the UPSA is selected based on the identifier for the wireless device, the identifier for the service, and the service security policy.

Aspect 20. A method for securely accessing a service of a wireless network, comprising: transmitting, to a security service of the wireless network, a first service access request for accessing a service of the wireless network, wherein the service is separate from the security service; receiving, from the security service in response to the first service access request, service security information for accessing the service; transmitting, to the service, a second service access request, the second service access request encoded based on the service security information; receiving, from the service, an indication to use a user plane security anchor (UPSA); and establishing a first security context with the UPSA based on the indication to use the UPSA.

Aspect 21. The method of Aspect 20, further comprising establishing a second security context with the service based on the service security information.

Aspect 22. The method of any of Aspects 20-21, further comprising: performing an authentication and key agreement procedure to generate a session root key; and establishing a third security context with the security service based on the session root key.

Aspect 23. The method of any of Aspects 20-22, wherein the indication to use the UPSA comprises a service security policy.

Aspect 24. An apparatus for securely accessing a service, comprising: a memory system comprising instructions; and a processor system coupled to the memory system, wherein the processor system is configured to: receive, by a security service from a service, a request for a service key for accessing the service, the request for the service key including an indication to use a user plane security anchor (UPSA); transmit, from the security service in response to the request for the service key, a service key response including the service key; receive an indication for a UPSA key, the indication including an identifier for a UPSA for the service; generate the UPSA key based on the identifier for the UPSA; and transmit the generated UPSA key to the UPSA for establishing a user plane security context between the UPSA and a wireless device.

Aspect 25. The apparatus of Aspect 24, wherein the request for the service key includes an identifier for the wireless device and an identifier for the service.

Aspect 26. The apparatus of Aspect 25, wherein the processor system is further configured to transmit a configuration request to a transport service to select a UPSA for the service.

Aspect 27. The apparatus of Aspect 26, wherein the indication for a UPSA key is received from the transport service.

Aspect 28. The apparatus of any of Aspects 26-27, wherein the indication to use the UPSA comprises a service security policy.

Aspect 29. The apparatus of Aspect 28, wherein the configuration request includes the identifier for the wireless device, the identifier for the service, and the service security policy.

Aspect 30. The apparatus of Aspect 29, wherein the UPSA for the service is selected based on the identifier for the wireless device, the identifier for the service, and the service security policy.

Aspect 31. The apparatus of any of Aspects 25-30, wherein the UPSA key is generated based on a session root key associated with the wireless device and the identifier for the service.

Aspect 32. The apparatus of any of Aspects 25-31, wherein the identifier for the wireless device comprises a temporary identifier.

Aspect 33. The apparatus of any of Aspects 24-32, wherein the indication for the UPSA key is received from the service, and wherein the indication for the UPSA key includes an identifier for the wireless device.

Aspect 34. The apparatus of any of Aspects 24-33, wherein the processor system is further configured to: derive the service key for accessing the service by the wireless device; and transmit, from the security service and to the wireless device, service key information for accessing the service.

Aspect 35. The apparatus of any of Aspects 24-34, wherein the indication for the UPSA key comprises an indication that the UPSA is not active for the service and the wireless device.

Aspect 36. An apparatus for securely accessing a service, comprising: a memory system comprising instructions; and a processor system coupled to the memory system, wherein the processor system is configured to: receive, by the service of a wireless network from a wireless device, a service access request, the service access request requesting access to the service, and the service access request including a temporary identifier for the wireless device; transmit a service key request from the service to a security service, the service key request including an indication to use a user plane security anchor (UPSA); receive, in response to the service key request, service key information for accessing the service; establish a security context with the wireless device based on the service key information; transmit a configuration request to a transport service to select a UPSA for the service; receive, in response to the configuration request, an identifier for the UPSA; and transmit, to a security service of the wireless network, an indication for a UPSA key, the indication for the UPSA key including the identifier for the UPSA for establishing user plane security context.

Aspect 37. The apparatus of Aspect 36, wherein the service key request includes the temporary identifier for the wireless device and an identifier for the service.

Aspect 38. The apparatus of any of Aspects 36-37, wherein the identifier for the UPSA is received from the transport service.

Aspect 39. The apparatus of any of Aspects 36-38, wherein the indication to use the UPSA comprises a service security policy Aspect 40. The apparatus of Aspect 39, wherein the indication for the UPSA key further includes the temporary identifier for the wireless device and the service security policy.

Aspect 41. The apparatus of any of Aspects 39-40, wherein the configuration request includes the identifier for the wireless device, the identifier for the service, and the service security policy.

Aspect 42. The apparatus of Aspect 41, wherein the UPSA is selected based on the identifier for the wireless device, the identifier for the service, and the service security policy.

Aspect 43. An apparatus for securely accessing a service of a wireless network, comprising: a memory system comprising instructions; and a processor system coupled to the memory system, wherein the processor system is configured to: transmit, to a security service of the wireless network, a first service access request for accessing a service of the wireless network, wherein the service is separate from the security service; receive, from the security service in response to the first service access request, service security information for accessing the service; transmit, to the service, a second service access request, the second service access request encoded based on the service security information; receive, from the service, an indication to use a user plane security anchor (UPSA); and establish a first security context with the UPSA based on the indication to use the UPSA.

Aspect 44. The apparatus of Aspect 43, wherein the processor system is further configured to establish a second security context with the service based on the service security information.

Aspect 45. The apparatus of any of Aspects 43-44, wherein the processor system is further configured to: perform an authentication and key agreement procedure to generate a session root key; and establish a third security context with the security service based on the session root key.

Aspect 46. The apparatus of any of Aspects 43-45, wherein the indication to use the UPSA comprises a service security policy.

Aspect 47. A non-transitory computer-readable medium having stored thereon instructions that, when executed by a processor system, cause the processor system to: receive, by a security service from a service, a request for a service key for accessing the service, the request for the service key including an indication to use a user plane security anchor (UPSA); transmit, from the security service in response to the request for the service key, a service key response including the service key; receive an indication for a UPSA key, the indication including an identifier for a UPSA for the service; generate the UPSA key based on the identifier for the UPSA; and transmit the generated UPSA key to the UPSA for establishing a user plane security context between the UPSA and a wireless device.

Aspect 48. The non-transitory computer-readable medium of Aspect 47, wherein the request for the service key includes an identifier for the wireless device and an identifier for the service.

Aspect 49. The non-transitory computer-readable medium of Aspect 48, wherein the instructions further cause the processor system to transmit a configuration request to a transport service to select a UPSA for the service.

Aspect 50. The non-transitory computer-readable medium of Aspect 49, wherein the indication for a UPSA key is received from the transport service.

Aspect 51. The non-transitory computer-readable medium of any of Aspects 49-50, wherein the indication to use the UPSA comprises a service security policy.

Aspect 52. The non-transitory computer-readable medium of Aspect 51, wherein the configuration request includes the identifier for the wireless device, the identifier for the service, and the service security policy.

Aspect 53. The non-transitory computer-readable medium of Aspect 52, wherein the UPSA for the service is selected based on the identifier for the wireless device, the identifier for the service, and the service security policy.

Aspect 54. The non-transitory computer-readable medium of any of Aspects 48-53, wherein the UPSA key is generated based on a session root key associated with the wireless device and the identifier for the service.

Aspect 55. The non-transitory computer-readable medium of any of Aspects 48-54, wherein the identifier for the wireless device comprises a temporary identifier.

Aspect 56. The non-transitory computer-readable medium of any of Aspects 47-55, wherein the indication for the UPSA key is received from the service, and wherein the indication for the UPSA key includes an identifier for the wireless device.

Aspect 57. The non-transitory computer-readable medium of any of Aspects 47-56, wherein the instructions further cause the processor system to: derive the service key for accessing the service by the wireless device; and transmit, from the security service and to the wireless device, service key information for accessing the service.

Aspect 58. The non-transitory computer-readable medium of any of Aspects 47-57, wherein the indication for the UPSA key comprises an indication that the UPSA is not active for the service and the wireless device.

Aspect 59. A non-transitory computer-readable medium having stored thereon instructions that, when executed by a processor system, cause the processor system to: receive, by a service of a wireless network from a wireless device, a service access request, the service access request requesting access to the service, and the service access request including a temporary identifier for the wireless device; transmit a service key request from the service to a security service, the service key request including an indication to use a user plane security anchor (UPSA); receive, in response to the service key request, service key information for accessing the service; establish a security context with the wireless device based on the service key information; transmit a configuration request to a transport service to select a UPSA for the service; receive, in response to the configuration request, an identifier for the UPSA; and transmit, to a security service of the wireless network, an indication for a UPSA key, the indication for the UPSA key including the identifier for the UPSA for establishing user plane security context.

Aspect 60. The non-transitory computer-readable medium of Aspect 59, wherein the service key request includes the temporary identifier for the wireless device and an identifier for the service.

Aspect 61. The non-transitory computer-readable medium of any of Aspects 59-61, wherein the identifier for the UPSA is received from the transport service.

Aspect 62. The non-transitory computer-readable medium of any of Aspects 59-62, wherein the indication to use the UPSA comprises a service security policy Aspect 63. The non-transitory computer-readable medium of Aspect 62, wherein the indication for the UPSA key further includes the temporary identifier for the wireless device and the service security policy.

Aspect 64. The non-transitory computer-readable medium of any of Aspects 62-63, wherein the configuration request includes the identifier for the wireless device, the identifier for the service, and the service security policy.

Aspect 65. The non-transitory computer-readable medium of Aspect 64, wherein the UPSA is selected based on the identifier for the wireless device, the identifier for the service, and the service security policy.

Aspect 66. A non-transitory computer-readable medium having stored thereon instructions that, when executed by a processor system, cause the processor system to: transmit, to a security service of a wireless network, a first service access request for accessing a service of the wireless network, wherein the service is separate from the security service; receive, from the security service in response to the first service access request, service security information for accessing the service; transmit, to the service, a second service access request, the second service access request encoded based on the service security information; receive, from the service, an indication to use a user plane security anchor (UPSA); and establish a first security context with the UPSA based on the indication to use the UPSA.

Aspect 67. The non-transitory computer-readable medium of Aspect 66, wherein the processor system is further configured to establish a second security context with the service based on the service security information.

Aspect 68. The non-transitory computer-readable medium of any of Aspects 66-67, wherein the processor system is further configured to: perform an authentication and key agreement procedure to generate a session root key; and establish a third security context with the security service based on the session root key.

Aspect 69. The non-transitory computer-readable medium of any of Aspects 66-68, wherein the indication to use the UPSA comprises a service security policy.

Aspect 70. An apparatus for wireless communications comprising one or more means for performing operations according to any of Aspects 1-69.

What is claimed is:

1. An apparatus for securely accessing a service, comprising:

a memory system comprising instructions; and a processor system coupled to the memory system, wherein the processor system is configured to:

receive, by a security service from a service, a request for a service key for accessing the service, the request for the service key including an indication to use a user plane security anchor (UPSA), wherein a UPSA is a type of service that establishes and maintains a user plane security context;

transmit, from the security service in response to the request for the service key, a service key response including the service key;

receive an indication for a UPSA key, the indication including an identifier for a UPSA for the service;

generate the UPSA key based on the identifier for the UPSA; and transmit the generated UPSA key to the UPSA for establishing a user plane security context between the UPSA and a wireless device.

2. The apparatus of claim 1, wherein the request for the service key includes an identifier for the wireless device and an identifier for the service.

3. The apparatus of claim 2, wherein the processor system is further configured to transmit a configuration request to a transport service to select a UPSA for the service.

4. The apparatus of claim 3, wherein the indication for a UPSA key is received from the transport service.

5. The apparatus of claim 3, wherein the indication to use the UPSA comprises a service security policy.

6. The apparatus of claim 5, wherein the configuration request includes the identifier for the wireless device, the identifier for the service, and the service security policy.

7. The apparatus of claim 6, wherein the UPSA for the service is selected based on the identifier for the wireless device, the identifier for the service, and the service security policy.

8. The apparatus of claim 2, wherein the UPSA key is generated based on a session root key associated with the wireless device and the identifier for the service.

9. The apparatus of claim 2, wherein the identifier for the wireless device comprises a temporary identifier.

10. The apparatus of claim 1, wherein the indication for the UPSA key is received from the service, and wherein the indication for the UPSA key includes an identifier for the wireless device.

11. The apparatus of claim 1, wherein the processor system is further configured to:

derive the service key for accessing the service by the wireless device; and transmit, from the security service and to the wireless device, service key information for accessing the service.

12. The apparatus of claim 1, wherein the indication for the UPSA key comprises an indication that the UPSA is not active for the service and the wireless device.

13. A method for securely accessing a service, comprising:

receiving, by a security service from a service, a request for a service key for accessing the service, the request for the service key including an indication to use a user plane security anchor (UPSA), wherein a UPSA is a type of service that establishes and maintains a user plane security context;

transmitting, from the security service in response to the request for the service key, a service key response including the service key;

receiving an indication for a UPSA key, the indication including an identifier for a UPSA for the service;

generating the UPSA key based on the identifier for the UPSA; and transmitting the generated UPSA key to the UPSA for establishing a user plane security context between the UPSA and a wireless device.

14. The method of claim 13, wherein the request for the service key includes an identifier for the wireless device and an identifier for the service.

15. The method of claim 14, further comprising transmitting a configuration request to a transport service to select a UPSA for the service.

16. The method of claim 15, wherein the indication for a UPSA key is received from the transport service.

17. The method of claim 15, wherein the indication to use the UPSA comprises a service security policy.

18. The method of claim 17, wherein the configuration request includes the identifier for the wireless device, the identifier for the service, and the service security policy.

19. The method of claim 18, wherein the UPSA for the service is selected based on the identifier for the wireless device, the identifier for the service, and the service security policy.

20. The method of claim 14, wherein the UPSA key is generated based on a session root key associated with the wireless device and the identifier for the service.

* * * * *